(12) United States Patent
Kim et al.

(10) Patent No.: US 7,860,502 B2
(45) Date of Patent: Dec. 28, 2010

(54) APPARATUS AND METHOD FOR HARD HANDOVER IN A WIRELESS COMMUNICATION SYSTEM

(75) Inventors: Min-Goo Kim, Yongin-si (KR); Young-Mo Gu, Suwon-si (KR); Sung-Soo Kim, Seoul (KR); Byung-Sik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 771 days.

(21) Appl. No.: 11/636,456

(22) Filed: Dec. 11, 2006

(65) Prior Publication Data
US 2007/0135125 A1    Jun. 14, 2007

(30) Foreign Application Priority Data
Dec. 10, 2005    (KR)    ............... 10-2005-0121190

(51) Int. Cl.
H04W 36/00    (2009.01)
H04W 4/00    (2009.01)
H04B 7/00    (2006.01)

(52) U.S. Cl. ............... 455/436; 455/437; 455/438; 455/439; 370/331; 370/332; 370/310

(58) Field of Classification Search ......... 370/331–334, 370/310; 455/432.1–444, 436–453
See application file for complete search history.

(56) References Cited

U.S. PATENT DOCUMENTS 5,740,208 A * 4/1998 Hulbert et al. ............... 375/346
5,862,124 A * 1/1999 Hottinen et al. ............. 370/335
6,792,276 B1 * 9/2004 Butovitsch et al. .......... 455/453
2005/0111408 A1 * 5/2005 Skillermark et al. ........ 370/331
2006/0007862 A1 * 1/2006 Sayeedi et al. ............. 370/235
2006/0068800 A1    3/2006 Ruelke et al.

FOREIGN PATENT DOCUMENTS

| KR | 1999-0078114 | 10/1999 |
| KR | 1020020030868 A | 4/2002 |
| KR | 1020020061330 A | 7/2002 |
| KR | 1020040015761 A | 2/2004 |
| KR | 1020050079856 A | 8/2005 |

* cited by examiner

Primary Examiner—Huy Phan
Assistant Examiner—Kathy Wang-Hurst
(74) Attorney, Agent, or Firm—Roylance, Abrams, Berdo & Goodman, L.L.P.

(57) ABSTRACT

Provided is a hard handover method in a wireless communication system. The hard handover method includes checking a signal-to-noise ratio (SNR) of a signal received from each of at least one neighboring base station (BS) while in communication with a serving BS, and canceling interference if the SNR of the signal received from each of the at least one neighboring BSs satisfies a select condition; sending a handover request to the serving BS, if a difference between a SNR of the interference-canceled signal and a SNR of the interference signal reaches a handover request threshold; and upon receipt of a handover approval from the serving BS, releasing a communication channel to the serving BS, and connecting a call to a BS that provides an interference signal whose SNR has reached the threshold.

28 Claims, 16 Drawing Sheets

APPARATUS AND METHOD FOR HARD HANDOVER IN A WIRELESS COMMUNICATION SYSTEM

CROSS-REFERENCE TO RELATED APPLICATION

This application claims the benefit under 35 U.S.C. §119 (a) of an application entitled "Apparatus and Method for Hard Handover in a Wireless Communication System" filed in the Korean Intellectual Property Office on Dec. 10, 2005 and assigned Serial No. 2005-121190, the entire disclosure of which is hereby incorporated by reference.

BACKGROUND OF THE INVENTION

1. Field of the Invention

The present invention relates to a handover apparatus and method in a wireless communication system. More particularly, the present invention relates to an apparatus and method for hard handover in a wireless communication system.

2. Description of the Related Art

Wireless communication systems have been developed to perform communications regardless of the location of the user. A mobile communication system is an example of a wireless communication system. Early mobile communication systems included a system that distinguishes users based on a Code Division Multiple Access (CDMA) scheme and supports voice communications.

There is now an increased interest in providing users data services. Accordingly, mobile communication systems, as they have evolved, can now provide data services. As the interest in the data services has increased, there has been an increase in user demand for mobile communication systems that can support higher data rates. Therefore, a $3^{rd}$ generation (3G) mobile communication system has been developed in order to provide higher-speed data services in the CDMA-based wireless communication system. 3G mobile communication systems are now partially in service.

However, the CDMA mobile communication system has almost reached its limitation in providing higher-speed data services due to its limited resources. Therefore, attempts are being made to provide mobile communication services with non-CDMA schemes. One of these attempts is to provide the communication services using an Orthogonal Frequency Division Multiplexing (OFDM) scheme.

The typical OFDM-based technologies include IEEE 802.16e, Wireless Broadband (WiBro), and 3G Long term evolution (LTE) technologies. These communication systems, when compared with the CDMA communication system, can transmit more data at higher speed with the use of the OFDM scheme.

In order to allocate OFDM resources to a plurality of users, an Orthogonal Frequency Division Multiple Access (OFDMA) scheme should be used. However, the OFDMA-based wireless communication system may suffer from interference between the signals transmitted from neighboring base stations (BSs). That is, when the signals transmitted from the neighboring BSs are received at the same orthogonal frequency overlap, a terminal may not receive the signals or may experience a decrease in reception performance. Therefore, the existing OFDMA systems generally use a frequency reuse factor (FRF) of 3. In this case, each BS uses only ⅓ of its total available orthogonal frequency resources. That is, as BSs use a 3-sector structure, only ⅓ of the available resources are allocated to one sector, thereby preventing collision with the other sectors over the orthogonal frequencies.

However, some currently proposed OFDM based technologies, such as IEEE 802.16e, WiBro, and 3G LTE technologies, adopt a system that uses FRF=1. In this case, as described above, the receiver may be unable to communicate or my suffer a decrease in reception performance at or near the cell boundary. In order to solve these problems, various solutions are proposed.

A wireless communication system should not restrict the mobility of the user. In order to overcome the mobility restriction of the user, the wireless communication system uses handover technology. The term "handover" refers to a method for allowing a terminal to maintain its call while it moves from its BS to another BS.

With reference to FIG. 1, a description will now be made of a possible handover scenario. FIG. 1 is a conceptual diagram used for a description of a conventional handover scenario in a cellular wireless communication system.

Referring to FIG. 1, BSs 110, 120 and 130 have independent cells 111, 121 and 131 according to delivery distances of their signals, and overlapping areas that occur between coverages of the BSs 110, 120 and 130. The overlapping areas are divided into the areas where signals transmitted from 2 BSs overlap with each other, and the area where signals transmitted from 3 BSs overlap each other. Specifically, an overlapping area 101 exists between the cell 111 of the first BS 110 and the cell 121 of the second BS 120, an overlapping area 103 exists between the cell 111 of the first BS 110 and the cell 131 of the third BS 130, and an overlapping area 105 exists between the cell 121 of the second BS 120 and the cell 131 of the third BS 130. In addition, an overlapping area 107 exists between the cells 111, 121 and 131 of the 3 BSs 110, 120 and 130.

In an exemplary with reference to FIG. 1, a terminal 140 is located in the overlapping area 107 where the cells 111, 121 and 131 of the 3 BSs 110, 120 and 130 overlap each other. If the terminal 140 moves from the cell 111 of the first BS 110 to the overlapping area 107 where the cells of the 3 BSs overlap each other, the terminal 140 is in a handover situation. The handover changes according to the direction in which the terminal 140 moves.

Handover is classified into soft handover and hard handover, and a description thereof will be made below.

Soft handover occurs when a terminal in communication with a particular BS moves to a cell of another BS through a boundary of the BS. Here, the current (or old) BS with which the terminal is now communicating is called a source BS and another (or new) BS to which the terminal is moving is called a target BS. A description will now be made of a process in which the soft handover is performed. If the terminal in communication with the source BS moves to one of the areas 101, 103, 105 and 107 where a plurality of BSs commonly transmit data, two or more BSs transmit the same data in the corresponding area. If the terminal enters the coverage area of a target BS while receiving the same data from two or more BSs, the other BSs transmitting data to the terminal stop the data transmission. In this manner, the terminal receives the data only from the BS to which it belongs.

Hard handover also occurs when a terminal in communication with a source BS moves to a cell of a target BS through a boundary of the source BS. In the hard handover method, the terminal receives data only from one BS. That is, if the terminal in communication with the source BS satisfies a select condition, the source BS transmitting data to the terminal stops the data transmission to the terminal. Thereafter, the target BS transmits data to the terminal.

With reference to FIG. 2, a description will now be made of the typical soft handover method currently used in the CDMA scheme.

FIG. 2 is a graph illustrating a relationship between the received signal and time and is used for a description of a scenario where conventional soft handover is used in the CDMA scheme.

Shown in the graph of FIG. 2 are received strengths for the signals that a terminal receives from each of BSs while on the move. In FIG. 2, a BS_A is a source BS to which the terminal belongs, and a BS_B is a target BS to which the terminal will perform handover. The signal strength measured by the terminal, for the signal transmitted by each BS, is referred to as "Ec/Ior of a pilot signal." As shown in FIG. 2, a curve 210 for the strength of a pilot signal received from the BS_A decreases with the passage of time, while a curve 220 for the strength of a pilot signal received from the BS_B increases with the passage of time. Referring to FIG. 1, this scenario occurs when the terminal 140 moves from the cell 111 of the first BS 110 to the cell 121 of the second BS 120.

As illustrated in FIG. 2, the terminal measures strengths of the pilot signals received from the BSs, and performs soft handover depending on the measurement result. A brief description of the soft handover operation will now be made.

Reference Points 1, 2, 3, 4, 5 and 6 shown on the time axis are time points given for a description of a soft handover scenario.

At Reference Point 1, the terminal is receiving service from the BS_A, and an active group of the terminal includes only BS_A. Even when the terminal is located in the cell of the BS_A, a pilot signal from the other BS may arrive at the terminal. Therefore, the terminal measures the strength of a pilot signal transmitted from the BS_B and compares the measured strength with a threshold T_ADD. If the measured strength of the pilot signal from the BS_B is greater than the threshold T_ADD, the terminal registers the BS_B in its candidate group and starts management thereof. That is, Reference Point 1 indicates the time point at which the BS_B is registered in the candidate group.

Thereafter, if the terminal continues to move to the cell of the BS_B, the strength of the pilot signal received from the BS_B becomes higher than the strength of the pilot signal received from the BS_A. After this situation, if the strength of the pilot signal from the BS_B is higher than the strength of the pilot signal from the BS_A by a given margin σ at Reference Point 2, the terminal registers the BS_B in its active group and starts management thereof. At this point, the terminal receives a handover message from the BS_A. The handover message includes BS_B information for handover, such as a Pseudo-random Noise (PN) offset and a traffic Walsh code number of the BS_B. From this time on, the terminal receives traffic signals from both the BS_A and the BS_B and soft-combines the received traffic signals. The terminal continues to manage the handover while monitoring the pilot signals from the two BSs. That is, two pilots are managed in the active group.

In the meantime, if the strength of the pilot signal from the BS_A is lower than T_DROP at Reference Point 3, the terminal starts a drop timer.

Thereafter, the strength of the pilot signal from the BS_A may become higher than T_DROP at Reference Point 4 according to a moving path of the terminal or a reception path of a signal. In this case, the terminal resets the drop timer.

Thereafter, if the terminal continues to progress to the cell of the BS_B and detects that the strength of the pilot signal from the BS_A becomes lower than T_DROP at Reference Point 5, the terminal starts the drop timer.

After the start of the drop timer, if the strength of the pilot signal from the BS_A continues to decrease and the measured time of the drop timer of the terminal arrives at a threshold T_TDROP at Reference Point 6, the terminal sends a pilot measurement result message to the BS_A, moves the pilot signal from the BS_A from the active group to a neighbor group, and then sends a handover complete message to the BS_A, completing the handover.

As described in FIG. 2, the soft handover is called "make-before-break-switching," because switching of BSs providing a service is achieved at the boundary of two BSs without a drop of the traffic. Therefore, for the soft handover, the terminal should always detect pilot signals from neighbor BSs, measure strengths of the detected pilot signals, and manage the BSs. In addition, for serving one terminal, two BSs should be activated. In other words, the same voice data or packet data should be allocated to two BSs for a soft handover interval.

Next, a description will be made of a hard handover scenario.

FIG. 3 is a graph illustrating a relationship between the received signal and time, and is used for a description of a scenario where conventional hard handover is performed.

Shown in the graph of FIG. 3 are received strengths for the signals that a terminal receives from each of at least two BSs while on the move. BS_A is a source BS to which the terminal belongs, and a BS_B is a target BS to which the terminal will perform handover. Herein, there is no specific restriction in the signal measured by the terminal. Generally, the signal measured by the terminal can be a pilot signal, but it can also be a traffic signal according to system. Therefore, the strength of the received signal can be SNR, CINR or CIR, all of which indicates a signal-to-noise ratio. Similarly, in FIG. 3, a curve 310 for the strength of a signal received from the BS_A decreases with the passage of time, while a curve 320 for the strength of a signal received from the BS_B increases with the passage of time. Referring to FIG. 1, this hard handover scenario occurs when the terminal 140 moves from the cell 111 of the first BS 110 to the cell 121 of the second BS 120.

Reference points are provided in FIG. 3 for the convenience of description. A description will now be made of an operation performed between a terminal and BSs with reference to the reference points.

At Reference Point 1, the terminal has been receiving a service from the BS_A, and an active group of the terminal includes only the BS_A. The terminal measures the strength of a signal transmitted from the BS_A, and compares the measured strength with a threshold H/O_Threshold. At this time, the terminal may measure the strength of a signal from a neighboring BS, BS_B for example, register BS_B in a candidate group, and start management thereof. Generally, however, in the system supporting hard handover, the frequency reuse factor (FRF) or frequency reuse pattern (FRP) is set to 3, 5 or 7, and thus BSs use different frequencies. Therefore, in order to measure the strength of the signal from the BS_B, the terminal should shift a reception frequency for a predetermined time before the measurement, and then return to the frequency of the current BS_A. In some cases, the terminal does not manage the candidate group because of the load. It will be assumed herein that the terminal does not manage the candidate group. As illustrated in FIG. 3, if the strength of the signal received from the BS_A is lower than a hard handover threshold at Reference Point 1, the terminal releases the channel connected to the BS_A. That is, if the terminal moves further to the cell of the BS_B, the terminal measures the strength of the signal transmitted from the BS_A, and if the measured strength is lower than or equal to a threshold H/O_Threshold, the terminal performs handover because it can no longer receive traffic signals from the BS_A. For handover, the terminal attempts to access a BS having the highest signal strength among neighboring BSs.

However, as shown in FIG. 3, in some cases, the strength of a signal from BS_B is also not high enough to receive traffic from Reference Point 1 to Reference Point 2. In other cases, even though the signal strength is high enough, the BS_B cannot respond to a service request from the terminal because resource management of the BS_B is impossible. In this case, a no-service duration or call drop can happen, as shown in FIG. 3.

As described above, the hard handover performs BS switching in a very simple manner, but is much inferior to the soft handover in terms of handover success rate and reception stability. That is, in the hard handover, also known as "Break-before-make-switching," if the strength of a signal from a serving BS decreases to a particular threshold, the terminal releases (or disconnects) the serving BS, and then searches for another BS. Therefore, the hard handover is generally used for FRP>1 due to the interference between neighbor cells. The CDMA soft handover is generally used for FRP=1.

As described above, the wireless communication system is being developed to transmit a larger amount of data at higher speed. The OFDMA systems are developed to meet the expectation.

A description will now be made of a WiBro or MobileWi-MAX system, which is the current IEEE 802.16-based OFDMA system.

As described above, the WiBro or MobileWiMAX system, which is the IEEE 802.16-based OFDMA system, uses FRF=1. The use of FRF=1 is advantageous in that the frequency efficiency is high, but disadvantageous in that all sub-carriers in use overlap with sub-carriers of neighboring BSs, causing mutual interference. Due to the interfering signals from the neighboring BSs, the terminal located in the cell boundary may suffer a decrease in reception performance, and experience call drop during handover.

With reference to FIG. 4, a description will now be made of structures of a downlink and an uplink used in the OFDMA system.

FIG. 4 is a diagram illustrating conventional structures of a downlink and an uplink used in an OFDMA system.

Referring to FIG. 4, reference numeral 410 indicates a structure of a downlink, and reference numeral 430 indicates a structure of an uplink. The vertical direction 401 represents a plurality of orthogonal frequency resources, i.e. sub-carriers. The structure of the downlink will be described below.

A preamble 411 is located at the head of the downlink 410, and then followed by a frame control channel (FCH) 413 containing frame configuration information and synchronization information, and a Downlink MAP (DL-MAP) 415. Thereafter, an Uplink MAP (UL-MAP) 417 containing position information of the bursts to be transmitted over the uplink is transmitted. After the UL-MAP 417, DL bursts 419, 421, 423, 425 and 427 to be provided to users together with the UL-MAP 417 are transmitted.

A control channel 431 is first transmitted over the uplink 430, and then UL bursts 433, 435, 437 and 439, which are data transmitted by users to a BS, are transmitted.

In the above data, the elements affecting a data rate of the entire system include such control information as the FCH 413, the DL-MAP 415 and the UL-MAP 417. The control information needs to be correctly received, in order for the terminal to receive the transmitted frame data without error.

The frame illustrated in FIG. 4 is a frame structure for the OFDMA system using a Time Division Duplexing (TDD) scheme. That is, it is shown that the frame is divided into a downlink (DL) interval and an uplink (UL) interval in the time axis 402. As described above, a first symbol of the downlink frame is the preamble 411. The terminal uses the preamble signal for synchronization acquisition, BS ID acquisition, and channel estimation. Because a BS ID of the BS is used as a seed value for scrambling and sub-carrier permutation, the BS ID acquisition is necessary for decoding downlink data bursts. The preamble 411 is followed by the FCH 413, and the FCH 413 contains information necessary for DL-MAP decoding. That is, the FCH 413 includes such information as a length and a decoding scheme of the DL-MAP 415. The DL-MAP 415 includes information necessary for decoding DL data bursts of this frame. That is, the DL-MAP 415 includes position and size information of each burst, and Modulation and Coding Scheme (MCS) information.

A description will now be made of a general structure of a transmitter for transmitting data.

FIG. 5 is a block diagram illustrating an internal structure of a conventional data transmitter used in an OFDMA system.

Referring to FIG. 5, transmission data is input to an encoder 501. An encoder capable of performing forward error correction (FEC) is used for the encoder 501. Because such an encoder is well known in the art, a description thereof will not be provided herein. The encoder 501 encodes the input data, and outputs the coded symbol to a symbol mapper 503. The symbol mapper 503 modulates the input symbol into a QPSK/16QAM/64QAM symbol. A repeater 505 repeats the modulated symbol according to a repetition number (the number of repetitions) set by a BS. The repeated symbols are input to a sub-carrier permutator 507, and the sub-carrier permutator 507 permutes the repeated symbols into corresponding sub-carriers. In the sub-carrier permutator 507, the repeated symbols are regularly permuted according to a sub-carrier permutation rule unique to each BS, and then allocated to sub-carriers. The sub-carriers are input to a scrambler 509, and the scrambler 509 multiplies the sub-carriers by a scrambling sequence unique to each BS. An Inverse Fast Fourier Transformer (IFFT) 511 converts the sub-carriers multiplied by the scrambling sequence into a transmission signal.

The transmission signal is converted into a radio signal and then transmitted to a receiver. A structure and operation of the receiver will now be described with reference to FIG. 6.

FIG. 6 is a block diagram illustrating an internal structure of a conventional data receiver used in an OFDMA system.

Referring to FIG. 6, a received radio signal is converted into a baseband signal, and then input to a Fast Fourier Transformer (FFT) 601. The FFT 601 converts the time-domain input signal into a frequency-domain signal. A descrambler 603 descrambles the signal output from the FFT 601 through an inverse process of the scrambling process performed in the transmitter. The descrambled signal is input to a channel estimator 605 and a channel compensator 607. The channel estimator 605 estimates a channel between the transmitter and the receiver depending on the descrambled signal, and provides the channel estimation information to the channel compensator 607.

The channel compensator 607 compensates for channel distortion using the descrambled signal and the channel estimation information. The signal output from the channel compensator 607 is input to a sub-channel ordering unit 609, and the sub-channel ordering unit 609 orders a signal of sub-channels each composed of sub-carriers, and outputs to the resulting signal to a repetition combiner 611. The repetition combiner 611 combines the signals repeated in the transmitter, and a symbol demapper 613 demaps the combined signal output from the repetition combiner 611 using a demapping scheme corresponding to the mapping scheme used for transmission. A decoder 615 decodes the demapped symbols into the transmitted data. An FEC decoder is used for the decoder 615. Data transmission/reception is achieved through the above process.

In order to overcome the foregoing interference problem in the cell boundary, the IEEE 802.16 standard modulates a BS transmission signal with low-order modulation such as QPSK, applies a low FEC coding rate, and uses a repetition number=6. Despite such attempts, in the fading channel, outage probability increases, so that data is not received at the terminal receiver in the cell boundary, and handover performance also deteriorates. In order to overcome such problems, FRF=3 should be used. However, the use of FRF=3, compared with the use of FRF=1, decreases the frequency efficiency to ⅓ and increases cell planning complexity.

Therefore, various other methods can be considered in order to increase reception performance of the receiver. For example, a scheme for obtaining reception diversity by applying two or more antennas to the receiver can be considered. In this scheme, reception performance increases by 3 dB or more with the use of only 2 reception antennas. In this case, however, complexity of the receiver considerably increases, and the performance degradation due to the interference signals is only negligibly improved. In the IEEE 802.16 system, the reception performance greatly depends on whether the DL-MAP is received. Because the DL-MAP is a signal that is broadcasted to all terminals associated with a BS as described in FIG. 4, DL-MAP reception performance is only negligibly improved even with the use of Smart Antenna (SA) technology, Multiple-Input-Multiple-Output (MIMO) technology, and Hybrid Automatic Repeat Request (HARQ) technology. In addition, the reduction in reception performance in the cell boundary causes degradation of handover performance.

The latest proposed OFDM/OFDMA-based mobile communication systems use FRP=1. In this case, because FRP=1, the system can also apply CDMA soft handover. However, most OFDM/OFDMA mobile communication systems consider using hard handover for the following reasons. Because the systems are basically Internet Protocol (IP)-based services rather than the voice services, a process of soft-combining IP packets in the cell boundary is a heavy load on the infrastructure system (including BS and wired IP network). That is, it is not easy to support a function that two BSs manage packets having the same IP address and soft-combine the IP packets.

For example, in order for two BSs to transmit packets having the same IP address and soft-combine the IP packets, the two BSs should simultaneously transmit the IP packets to the terminal. However, the IP packet service is provided for transmission, scheduling of which does not guarantee continuity. Therefore, each BS has a queue, which is a kind of a packet buffer, to transmit packets according to priority. A process of simultaneously transmitting the same packets to queues of two BSs for soft combining may cause overflow of the queues, and in the worst case, bring the system down. Therefore, current systems consider using the hard handover even though there is interference between neighboring cells.

Referring back to FIG. 3, if the terminal performs handover in the course of receiving IP packets from the BS_A, it should disconnect the BS_A and then access the BS_B. At this point, the terminal re-establishes an IP network with the BS_B and re-accesses the BS_B using the same IP address. For example, the 3GPP2 cdma2000 1xEV-DV, cdma2000 1xEV-DO, and 3GPP HSDPA/HSUPA standards also consider using the hard handover, and instead, consider using Fast Cell Switching or Fast Cell Selection. In most cases, however, such systems cannot normally receive control signals for packet reception and traffic signals because the interference power in the cell boundary is very high. In particular, a loss of the control signals increases the handover failure rate and considerably decreases the system throughput. In addition, the hard handover, compared with the existing soft handover, increases handover processing time, causing a considerable reduction in quality of service (QoS) for the services having a very strict timing constraint, like the Voice over IP (VoIP) service. Accordingly, for actual system implementation, there is a strong demand for solutions to the problems in the FRP=1 system.

Accordingly, there is a need for an improved apparatus and method for handover in a wireless communication system.

SUMMARY OF THE INVENTION

Exemplary embodiments of the present invention address at least the above problems and/or disadvantages and provide at least the advantages described below. Accordingly, an aspect of an exemplary embodiment of the present invention is to provide an apparatus and method for safely transmitting control signals in a wireless communication system with FRF/FRP=1.

It is another aspect of an exemplary embodiment the present invention to provide a stable hard handover method in a wireless communication system for IP packet transmission, and an apparatus for controlling the same.

It is further another aspect of an exemplary embodiment the present invention to provide a handover method for preventing a decrease in QoS in a wireless communication system, and an apparatus for controlling the same.

It is yet another aspect of an exemplary embodiment the present invention to provide an apparatus and method for increasing system throughput by safely transmitting control signals in a wireless communication system.

It is still another aspect of an exemplary embodiment the present invention to provide a method for providing stable hard handover in an OFDMA wireless communication system, and an apparatus for controlling the same.

According to another aspect of an exemplary embodiment the present invention, there is provided a hard handover method in a wireless communication system. The hard handover method includes checking a signal-to-noise ratio (SNR) of a signal received from each of at least one neighboring base station (BS) while in communication with a serving BS, and canceling interference if the SNR of the signal received from each of the at least one neighbor BS satisfies a select condition; sending a handover request to the serving BS, if a difference between a SNR of the interference-canceled signal and a SNR of the interference signal reaches a handover request threshold; and upon receipt of a handover approval from the serving BS, releasing a communication channel to the serving BS, and connecting a call to a BS that provides an interference signal whose SNR has reached the threshold.

According to still another aspect of an exemplary embodiment the present invention, there is provided a hard handover method in a wireless communication system. The hard handover method includes checking a signal-to-noise ratio (SNR) of a signal received from each of at least one neighboring base station (BS) while in communication with a serving BS, and canceling interference if the SNR of the signal received from each of the at least one neighboring BSs satisfies a select condition; estimating a transmitted symbol from a symbol demodulated during the interference cancellation, and calculating an energy difference between the demodulated symbol and the estimated symbol; sending a handover request to the serving BS, if the energy difference reaches a handover request threshold; and upon receipt of a handover approval from the serving BS, releasing a communication channel to the serving BS, and connecting a call to a BS that provides an interference signal whose SNR has reached the threshold.

According to further another aspect of an exemplary embodiment the present invention, there is provided a hard handover method in a wireless communication system. The hard handover method includes checking a signal-to-noise ratio (SNR) of a signal received from each of at least one neighboring base station (BS) while in communication with a serving BS, and canceling interference if the SNR of the signal received from each of the at least one neighboring BS satisfies a predetermined condition; sending a handover request to the serving BS, if a SNR of the interference signal reaches a threshold for handover trial during the interference cancellation; and upon receipt of a handover approval from the serving BS, releasing a communication channel to the serving BS, and connecting a call to a BS that provides an interference signal whose SNR has reached the threshold.

According to yet another aspect of an exemplary embodiment the present invention, there is provided a hard handover apparatus in a wireless communication system. The hard handover apparatus includes a receiver for estimating a channel from each of at least one base station (BS), and converting a signal from a serving BS into data while receiving signals from at least one BS using the estimated information; an interference signal generator for generating a signal of a particular interfering BS among the signals processed by the receiver, and generating an interference signal using the channel estimation information; a transmitter for performing transmission of a signal and a control message to be transmitted to a BS; and a controller for controlling the interference signal generator so as to cancel an interference signal, if strength of a signal received from each of interfering BSs among the at least one BS satisfies an interference cancellation condition; generating a handover request message and controlling transmission of the handover request message to the serving BS by controlling the controller, if a strength of a signal received from a particular BS among the neighboring BSs satisfies a handover condition during the interference cancellation; and upon receipt of a handover approval from the serving BS, controlling release of a communication channel to the serving BS and controlling connection of a call to the particular BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Exemplary embodiments of the present invention propose a hard handover method. The hard handover proposed in the exemplary embodiments of the present invention is active handover, and the active handover method actively performs hard handover. Exemplary embodiments of the present invention propose a handover scheme for the system that uses an interference cancellation scheme in an FRP/FRF=1 environment. For that purpose, exemplary embodiments of the present invention provide a scheme for canceling interference signals from neighbor BSs to increase a handover success rate, and shortening a handover switching time so that user packets can be switched between two BSs within a short time, and also defines detailed operating steps thereof.

Before a description of a handover scheme proposed according to the exemplary embodiments of the present invention is given, the reason why the proposed handover is needed will be described again below.

The most reliable way to increase reception performance for the terminal located in the cell boundary is to cancel interference signals generated from other BSs. The interference cancellation technique is not a new technique, but has been studied so far in the CDMA system. For cancellation of the interference signals, there is a need for a series of processes of correctly estimating/detecting an interference signal, regenerating the detected interference signal in the form of a transmission signal, and subtracting the regenerated interference signal from a received signal. The DL-MAP is the most appropriate data to which the interference cancellation scheme can be applied. The DL-MAP, as it is received from all BSs at the same position, is most likely to incur inter-BS interference, and is the main cause of decreasing handover performance. The core of the interference cancellation technique is to correctly detect an interference signal, and because the DL-MAP is generally QPSK-modulated and repeated many times (i.e. high repetition number is used), it is useful for correctly detecting interference signals. In addition, because the DL-MAP follows immediately after the preamble signal which is less affected by interfering signals, it is also useful for channel estimation of the interfering signals based on the preamble signal.

Figure 1:
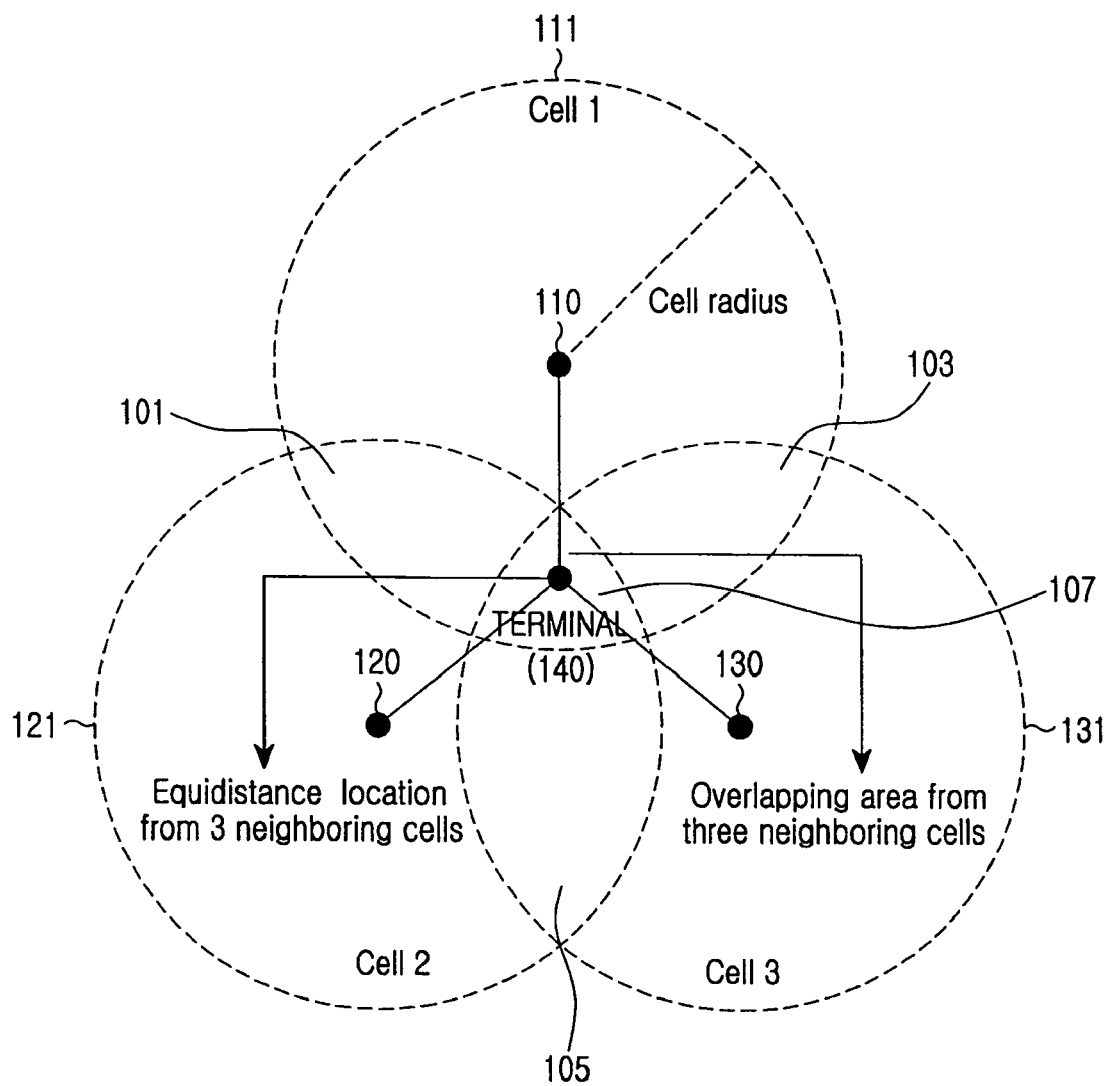
FIG. 1 is a conceptual diagram used for a description of a conventional handover scenario in a cellular wireless communication system.
Figure 2:
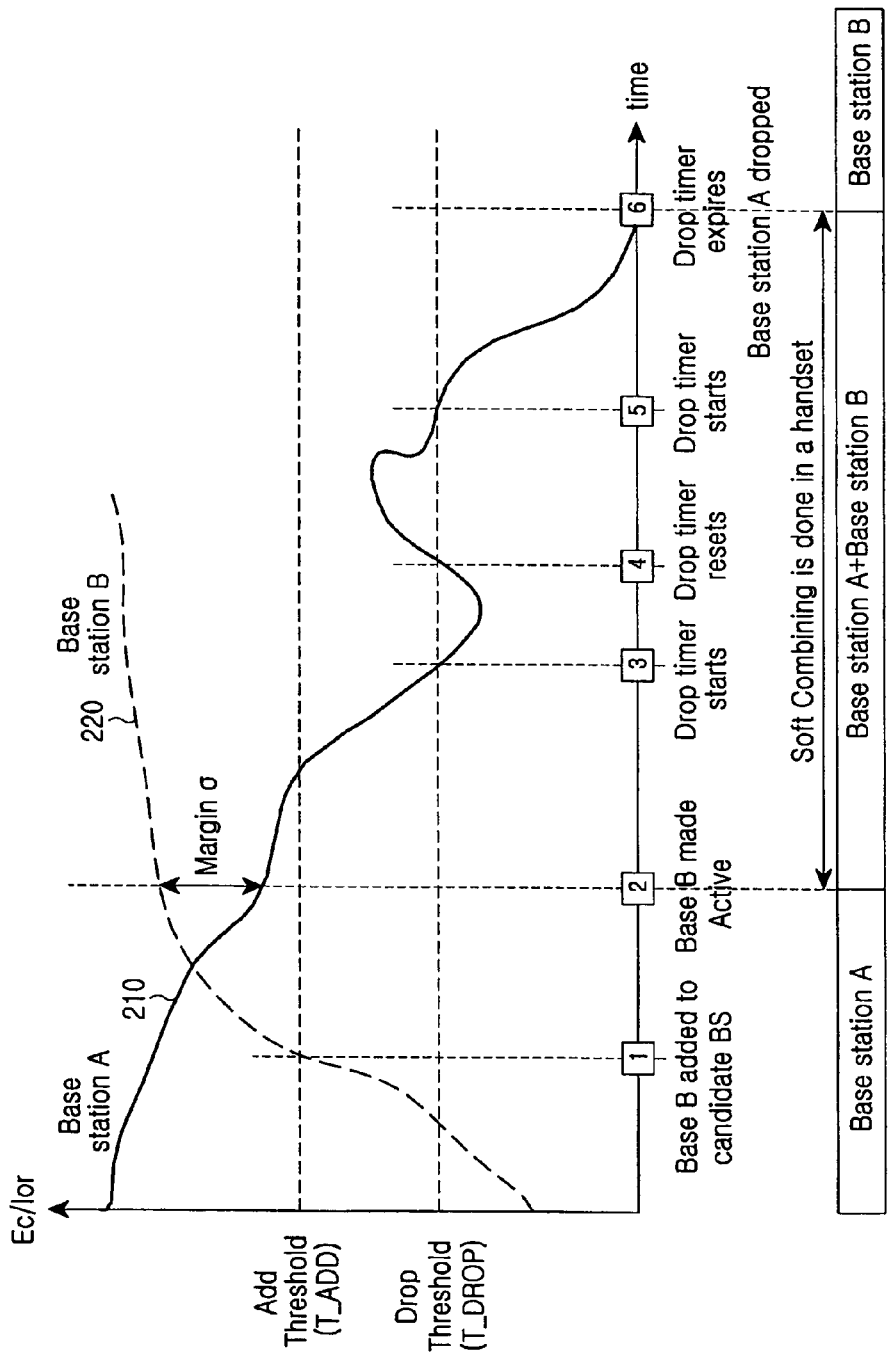
FIG. 2 is a graph illustrating a relationship between the received signal and time, and is used for a description of a scenario where conventional soft handover is used in the CDMA scheme.
Figure 3:
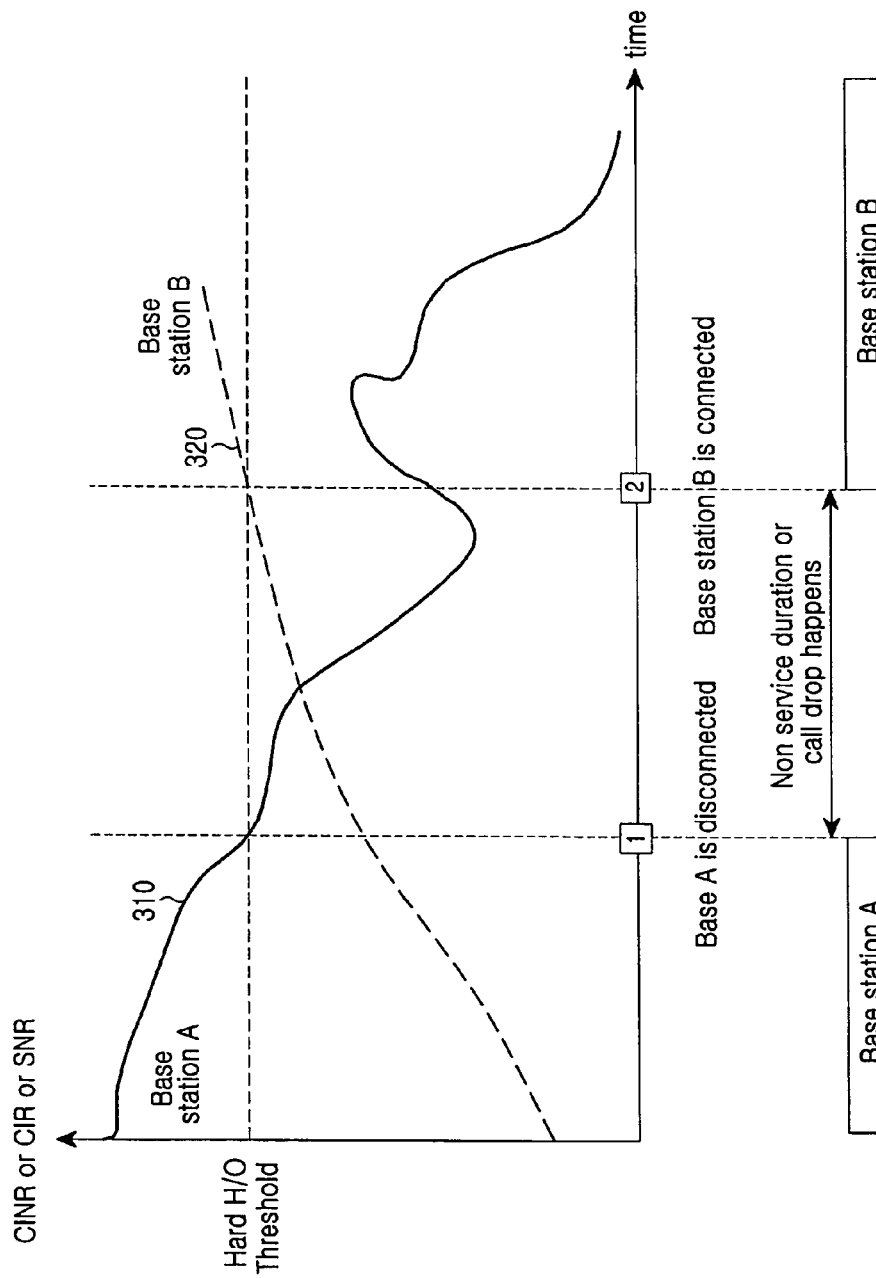
FIG. 3 is a graph illustrating a relationship between the received signal and the time, and is used for a description of a scenario where conventional hard handover is performed.
Figure 4:
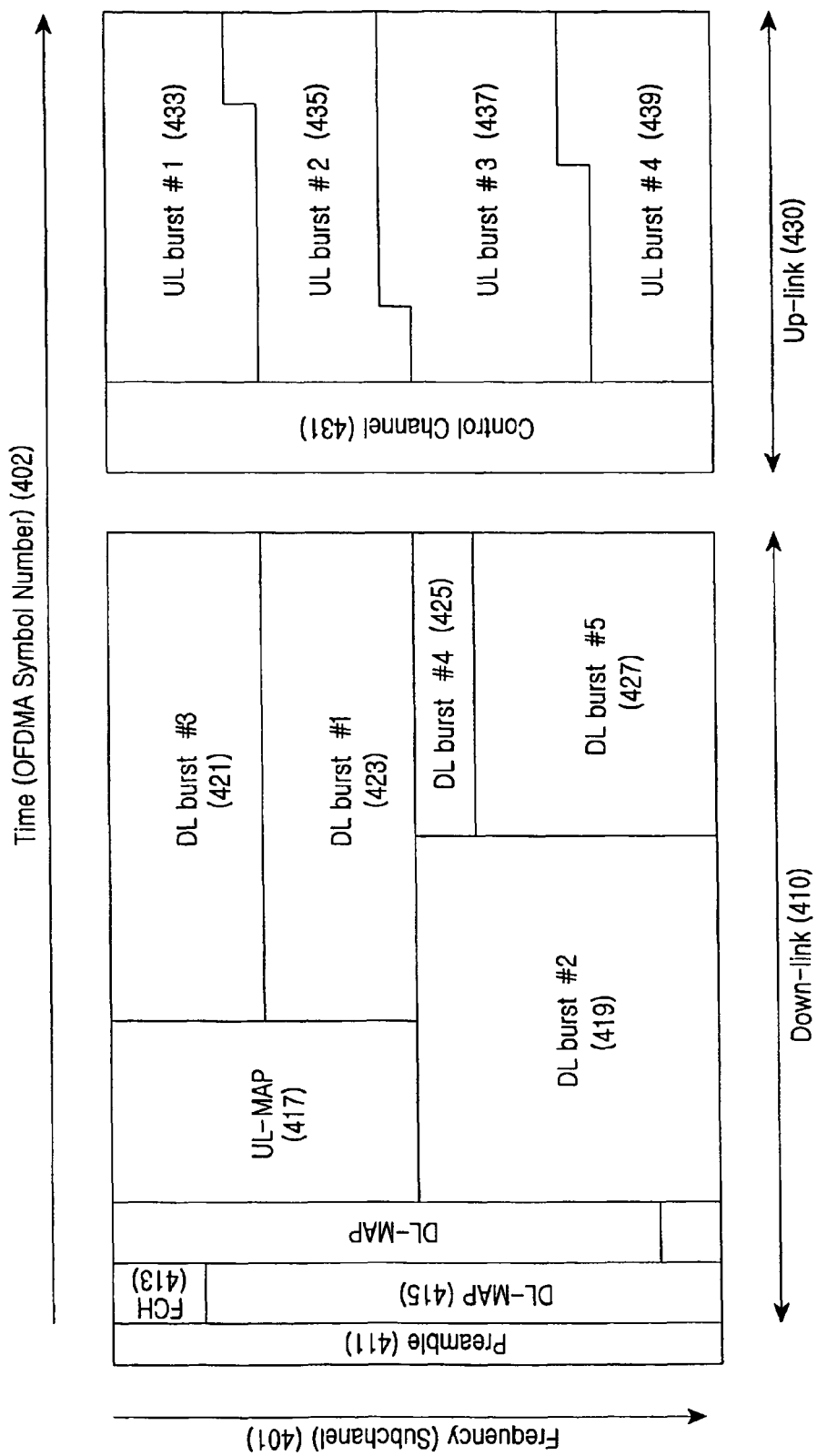
FIG. 4 is a diagram illustrating conventional structures of a downlink and an uplink used in an OFDMA system.
Figure 5:
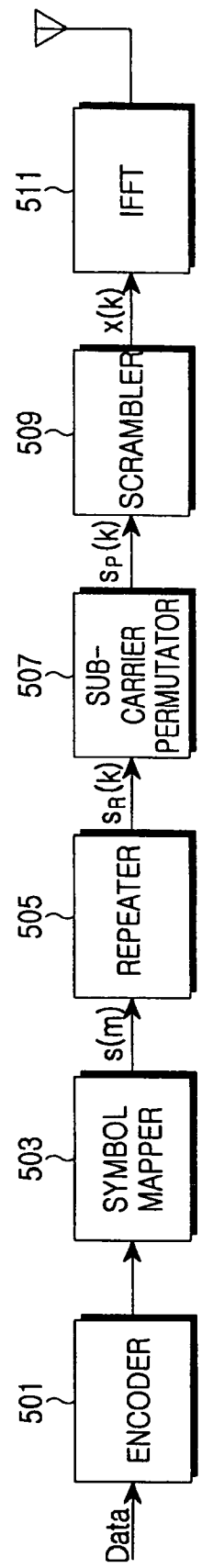
FIG. 5 is a block diagram illustrating an internal structure of a conventional data transmitter used in an OFDMA system.
Figure 6:
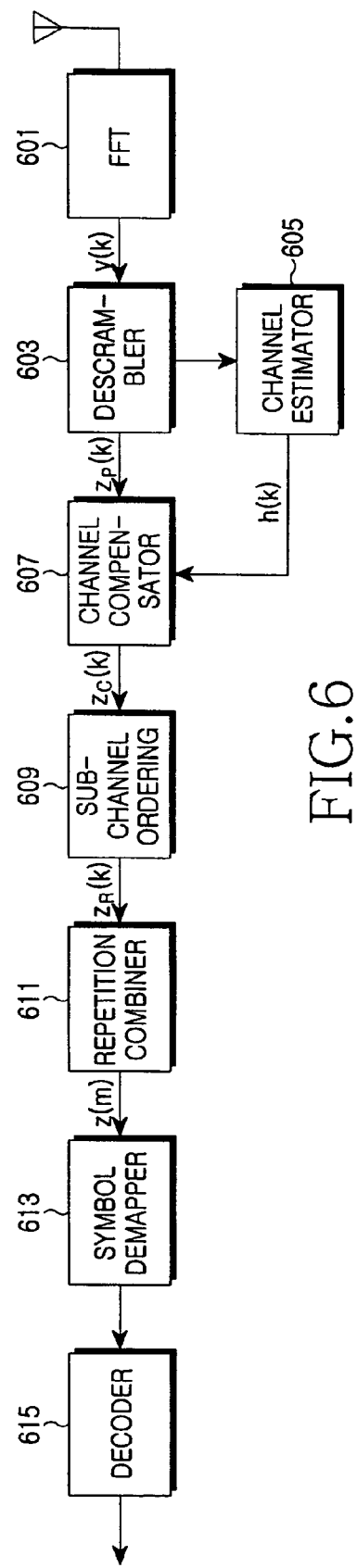
FIG. 6 is a block diagram illustrating an internal structure of a conventional data receiver used in an OFDMA system.

For a description of the basic principle of exemplary embodiments of the present invention, the signals transmitted/received using the structures of the transmitter and the receiver described in FIGS. 5 and 6 will now be described mathematically.

A process of processing the signals transmitted/received in the transmitter of FIG. 5 and the receiver of FIG. 6 will now be described mathematically.

A transmission process will first be described.

If an output of the symbol mapper 503 that symbol-maps input coded source data is defined as s(m), the output s(m) of the symbol mapper 503 can be expressed as Equation (1).

$$s(m), m=0, \ldots, M-1 \quad (1)$$

An output of the repeater 505, obtained by repeating the output s(m) of Equation (1) R times, can be expressed as Equation (2).

$$s_R(k)=s(k \bmod M), k=0, \ldots, N-1 \quad (2)$$

In Equation (2), M denotes a length of a symbol, N denotes a length of the symbols obtained after R repetitions, and k is a value between 0 and N−1. Therefore, a relationship of Equation (3) is given.

$$N=RM \quad (3)$$

The repeated symbols are permuted by the sub-carrier permutator 507, and the permutation result can be expressed as Equation (4).

$$S_p(k)=S_R(P(k)), k=0, \ldots, N-1 \quad (4)$$

In Equation (4), P(k) is a permutation sequence used for 1:1 mapping using a value between 0 and N−1, determined according to a specific rule. The permuted symbols are input to the scrambler 509. If a scrambling sequence having a value 1 or −1 is defined as c(k), an output x(k) of the scrambler 509 can be expressed as Equation (5).

$$x(k)=c(k)s_p(k), k=0, \ldots, N-1 \quad (5)$$

The receiver of a terminal receives interference signals not only from the serving BS but also from neighbor BSs. If only one interference signal $x_I(k)$ among the interference signals is considered, a received signal y(k), to which a noise signal n(k) is added, can be expressed as Equation (6).

$$y(k)=h_s(k)x_s(k)+h_I(k)x_I(k)+n(k) \; k=0, \ldots, N-1 \quad (6)$$

In Equation (6), $h_s(k)$ denotes a frequency response of the channel corresponding to a $k^{th}$ sub-channel between the serving BS and the terminal, and $h_I(k)$ denotes a frequency response of the channel corresponding to a $k^{th}$ sub-channel between the neighbor BS and the terminal. If power of the signal s(m) is assumed to be 1, and s(m), $h_s(k)$, $h_I(k)$ and n(k) are assumed to be independent of each other, a Carrier to Interference plus Noise Ratio (CINR) of the channel can be expressed as Equation (7).

$$CINR = \frac{1}{N}\sum_{k=0}^{N-1} \frac{E\{|h_s(k)|^2\}}{E\{|h_I(k)|^2\} + E\{|n(k)|^2\}} \quad (7)$$

Next, a signal y(k) received at an OFDMA receiver will be described. An output $z_p(k)$ of the descrambler 603 that descrambles the received signal y(k) is expressed as Equation (8).

$$z_p(k)=c_s(k)y(k), k=0, \ldots, N-1 \quad (8)$$

In Equation (8), $c_S(k)$ denotes a scrambling sequence of the serving BS. The channel compensator 607 compensates the channel using the estimated channel from the channel estimator 605, and an output $z_c(k)$ of the channel compensator 607 can be expressed as Equation (9).

$$z_c = \frac{\hat{h}(k) * z_P(k)}{|\hat{h}(k)|^2}, k = 0, \ldots, N-1 \quad (9)$$

In Equation (9), (*) denotes a complex conjugate. The sub-carriers estimated using Equation (9) are reordered in the sub-channel ordering unit 609, and an output of the sub-channel ordering unit 609 can be expressed as Equation (10).

$$Z_R(P_S(k))=z_c(k), k=0, \ldots, N-1 \quad (10)$$

In Equation (10), $P_S(k)$ denotes a permutation sequence of the serving cell, and this signal is combined by the repetition combiner 611. The combined signal output from the repetition combiner 611 can be expressed as Equation (11).

$$z(M) = \frac{1}{R}\sum_{r=0}^{R-1} z_R(m+Mr), m = 0, \ldots, M-1 \quad (11)$$

A mean square error (MSE) of the signal input to the symbol demapper 613 can be expressed as Equation (12).

$$MSE = \frac{1}{M}\sum_{m=0}^{M-1} E\{|s(m)-z(m)|^2\} \quad (12)$$

As can be understood from Equation (12), MSE is different from the received signal y(k). Therefore, the MSE is a value obtained by estimating transmitted symbols from the symbols finally obtained after demodulation, and then calculating a difference between the estimated symbols. That is, the MSE can be regarded as a kind of a metric used for symbol decision. Commonly, an optimal symbol decision scheme, for example, Maximum Likelihood Decision scheme, estimates the minimum-MSE symbol as a transmission symbol. In the following description, exemplary embodiments of the present invention use the MSE as a factor for estimating the strength of an interference signal. That is, an increase in the MSE indicates an increase in the strength of the interference signal, and the very low MSE indicates that there is almost no interference signal and noise. As is well known, if an Additive White Gaussian Noise (AWGN) is constant, it is possible to correctly estimate the presence/absence of the interference signal from the MSE.

Figure 7:
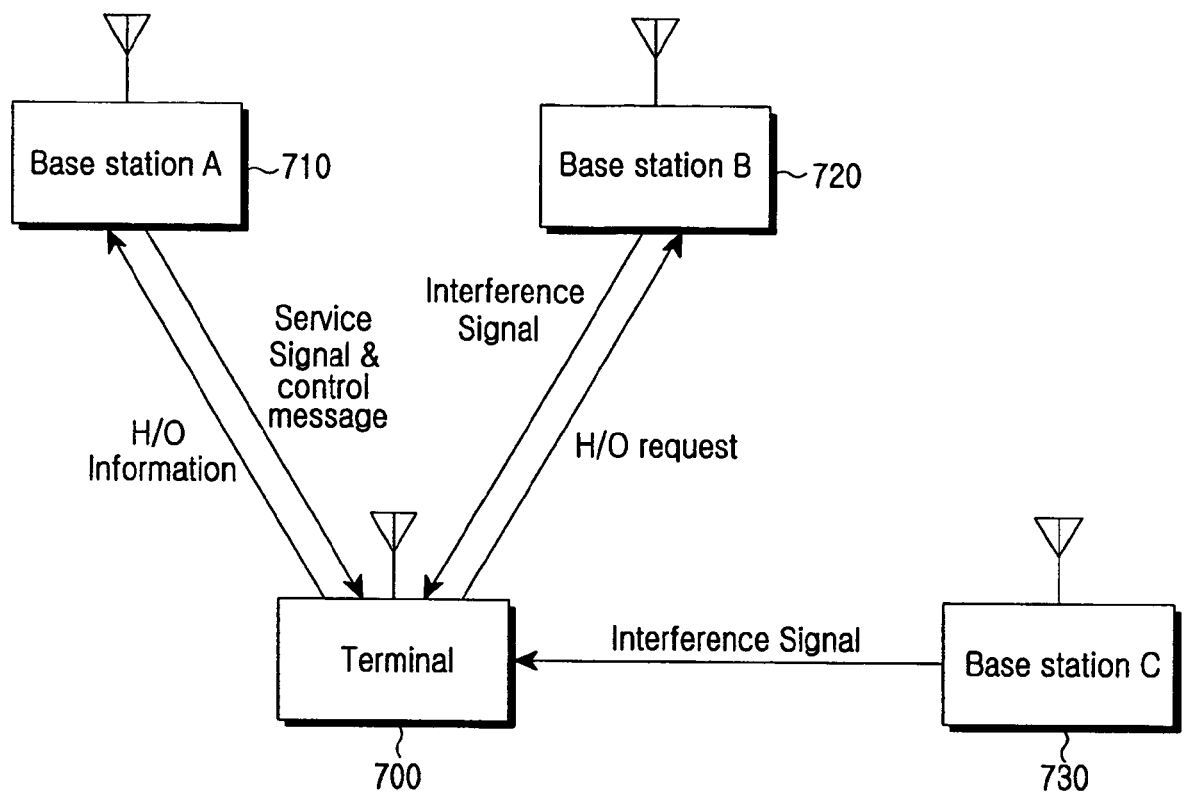
FIG. 7 is a conceptual diagram for a description of a hard handover condition and a hard handover process according to an exemplary embodiment of the present invention.

FIG. 7 is a conceptual diagram used for a description of a hard handover condition and a hard handover process according to an exemplary embodiment of the present invention. With reference to FIG. 7, a brief description will now be made of a hard handover condition and a hard handover process according to an exemplary embodiment of the present invention.

It is assumed in FIG. 7 that there are 3 BSs of a BS_A 710, a BS_B 720 and a BS_C 730. It is also assumed that a terminal 700 is located in a cell of the BS_A 710, and receives service signals and control messages from the BS_A 710. When the terminal 700 receives service signals and control messages from the BS_A 710, the signals received from the BS_B 720 and the BS_C 730 all act as interference signals. In this situation, if the terminal 700 moves into a cell of, for example, the BS_B 720 as shown in FIG. 7, it performs handover by sending a handover request message to the BS_B 720. A detailed description thereof will be made below.

As illustrated in FIG. 7, the terminal 700 located in the cell boundary receives high-strength interference signals not only from the serving BS but also from the neighboring BS, causing a decrease in its reception performance, particularly, causing a loss of the control information such as FCH, DL-MAP, and UL-MAP. The loss of the control information causes an error in an important reception operation, such as handover. Basically, in the FRF=1 environment, such a phenomenon is inevitable, and it is known that the OFDMA system, since its BS output power is higher than that of the CDMA system, needs more attempts to solve the interference problem.

A description will now be made of three exemplary embodiments of the present invention. Each of the three exemplary embodiments may include exemplary sub-embodiments.

Before a description of the exemplary embodiments of the present invention is given, a definition of the terms used herein will be given for convenience. A BS that currently provides a service to a terminal is defined as a serving BS, and the other BSs are defined as interfering BSs that transmit interference signals. A BS to which the terminal desires to perform handover is defined as a target BS. In most cases, in the cell boundary where handover is considered, there is a high possibility that an interfering BS having a high signal strength will be a target BS. Therefore, a target BS can be one of the interfering BSs. In the following description, handover according to exemplary embodiments of the present invention indicates hard handover and active handover.

CINR-based Handover 1

Figure 8:
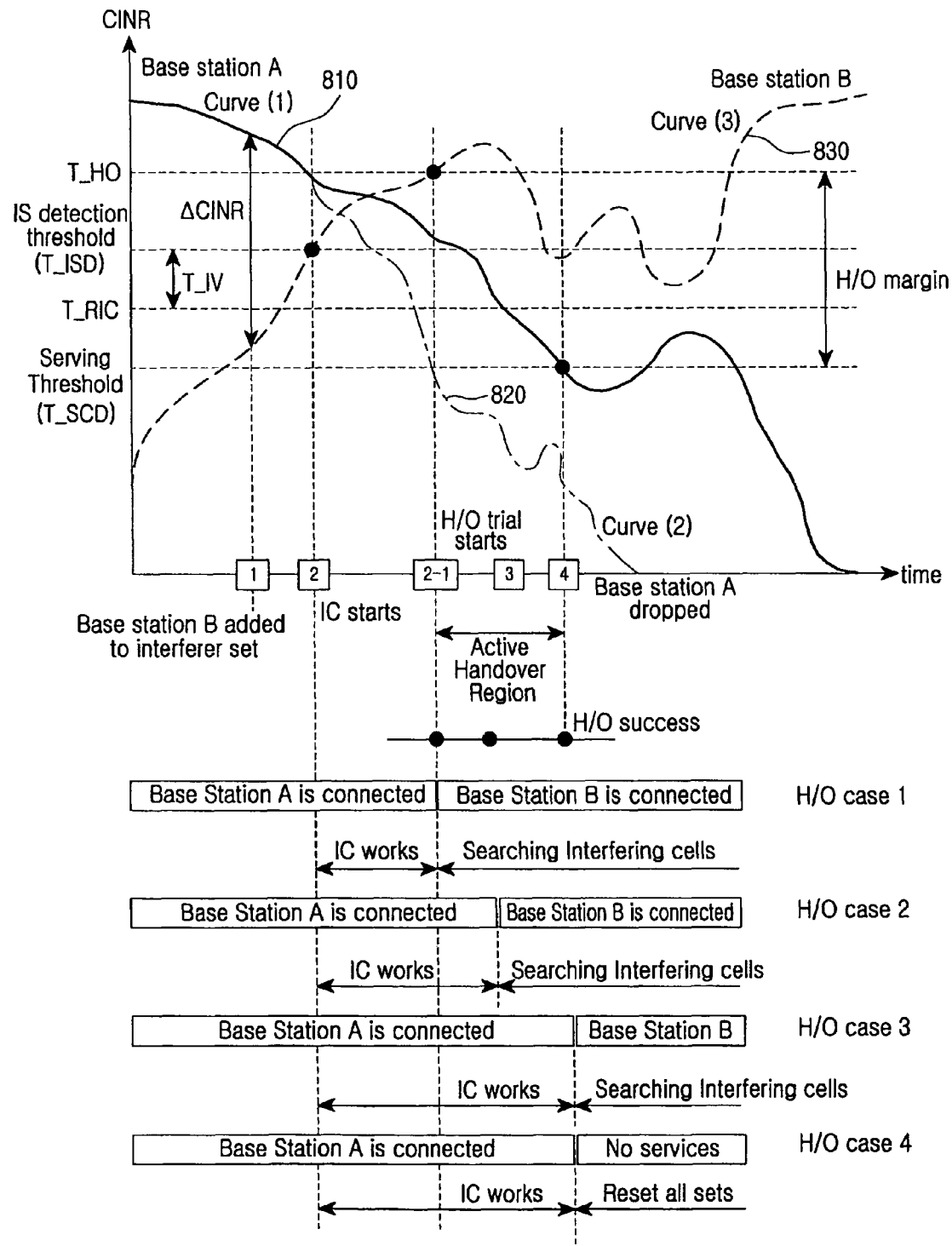
FIG. 8 is a CINR-time graph for a description of a seamless hard handover operation according to an exemplary embodiment of the present invention.

FIG. 8 is a CINR-time graph for a description of a seamless hard handover operation according to an exemplary embodiment of the present invention. The description of FIG. 8 will be made with reference to the structure of FIG. 7.

It is assumed that the terminal 700 moves to the BS_B 720 while receiving a service from the BS_A 710. In this state, the terminal 700 completes handover to the BS_B 720 according to a variance in a measured CINR through the following steps.

Step 1

Initially, the terminal 700 is receiving a service from the BS_A 710, and at the same time, the terminal 700 measures signal strengths of neighboring BSs, i.e. measures a CINR of the BS_A 710 (serving BS) and a CINR of the BS_B 720 (interfering BS), and calculates a difference ΔCINR between the measured CINRs. If ΔCINR is less than a threshold 66 CINR_TH for the interferer candidate decision, the terminal 700 registers the interfering BS that transmits the interference signal, in an interferer candidate group (ICG). The terminal 700 activates interference cancellation only for the BS or signal source whose signal strength exceeds an interference cancellation allow threshold T_ISD among the BSs or signal sources that transmit interference signals. The reason for activating interference cancellation only for the BS or signal source that transmits a signal whose strength is higher than or equal to a particular value is because even though ΔCINR is less than the threshold, the received signal and the interference signal both can have very low signal strength (CINR, CIR or SNR) presently In this case, even though interference cancellation is activated, the interference detection failure probability increases, and performance of the received signal may decrease unexpectedly due to the wrong interference estimation.

Step 2

To avoid ambiguity of the operation described below, a definition of the interference signal will be given. The "interference signal" as used herein refers to the signal that the receiver selected for interference cancellation. Commonly, the interference signal means a signal having the highest strength or a signal for which cancellation should be considered first, among the signals in an interferer group (IG). Optionally, the receiver may simultaneously cancel a plurality of interference signals. In this case, the following operation can be equally performed on each of the interference signals.

Interference cancellation is activated only for the BS or signal source whose ΔCINR is less than a threshold and whose interference signal to be canceled has a strength that exceeds an interference cancellation allow threshold T_ISD. The corresponding BS is registered in the interferer group. With the use of a threshold (T_IV) of interference variance, if the strength of the interference signal is less than T_ISD but greater than a threshold T_RIC (=T_ISD-T_IV) for the release of interference cancellation, the receiver continues to activate the interference cancellation. This is because fading occurs due to a variance of the channel and movement of the terminal, so that the signal strength fluctuates instantaneously. In this case, it is generally advantageous to continue the interference cancellation in terms of average performance. In addition, it is possible to maintain stable operation without overshoot of the controller by applying hysteresis instead of controlling an interference canceller every time. Although a timer is generally used for the hysteresis operation, exemplary embodiments of the present invention, as it aims at interference cancellation, applies a hysteresis operation based on signal strength. However, exemplary embodiments of the present invention can also perform the hysteresis operation using the timer.

FIG. 8 shows a relationship between T_RIC, T_ISD and T_IV. As shown in FIG. 8, while activation of the interference cancellation is performed at a high interference strength, release of the interference cancellation is performed at a sufficiently low interference strength. In actual system implementation, a decision on T_IV can be made through field verification or a simulation that takes into account a Doppler frequency based on mean fading, and a variance in signal strength. Further, there are various other possible methods by which to make a decision on T_IV. Therefore, a detailed description thereof will not be provided herein, to avoid unnecessary limitation on the exemplary embodiments of the invention. As one extreme example, T_IV can be set to '0.0', and this means that the interference cancellation is activated or released very fast according to a variance in the interference strength.

A description will now be made of an activation condition and a release condition of the interference cancellation.

Figure 9:
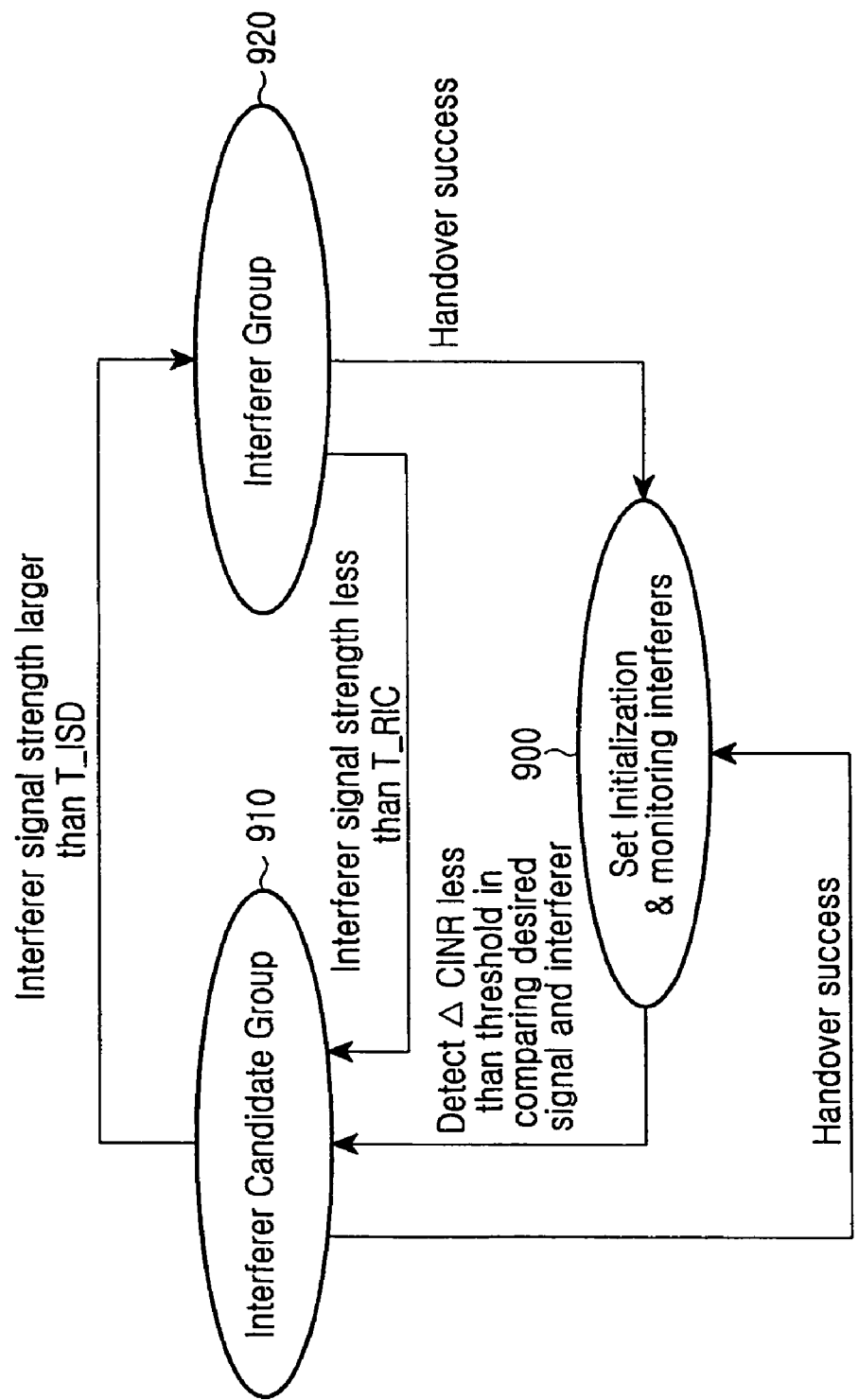
FIG. 9 is a diagram illustrating state transition of a terminal based on an interference signal group according to an exemplary embodiment of the present invention.

FIG. 9 is a diagram illustrating a state transition of a terminal based on an interference signal group according to an exemplary embodiment of the present invention. With reference to FIG. 9, a description will now be made of state transition of a terminal based on an interference signal group according to an exemplary embodiment of the present invention.

In an exemplary case of FIG. 9, a terminal manages each of BSs. For the management of the BSs, a definition of each of the following states is given. As shown in FIG. 9, the interference control state transition for interference cancellation at the terminal includes a Set Initialization & Monitoring Interferes state 900, an Interferer Candidate Group 910, and an Interferer Group 920. A detailed description thereof will now be made below.

The Set Initialization & Monitoring Interferes state 900 corresponds to one of the states where a service of the terminal first starts, the state where initial registration is performed, and the state where initialization should be performed in response to the success or failure of a handover. In this case, the terminal initializes all BSs, and detects interference signals. Thereafter, in the Set Initialization & Monitoring Interferes state 900, the terminal detects various signals received from the serving BS, and calculates a difference between the signal received from the serving BS and the other signals among the detected signals. The calculated difference is denoted by ΔCINR. Thereafter, the terminal compares the ΔCINR with a predetermined threshold, and if the ΔCINR is less than or equal to the threshold, the terminal determines the signal source as a signal source that transmits the interference signal. Generally, the signal source is the signal that the neighbor BS transmits. Therefore, the terminal has the determined signal sources in the Interferer Candidate Group 910. Among the signal sources in the Interferer Candidate Group 910, the signal sources whose strength exceeds an interference cancellation allow threshold T_ISD are registered in the Interferer Group 920. For the signal sources registered in the Interferer Group 920, an interference canceller is enabled to cancel the interference signals. If the strength of the signal from the BS registered in the Interferer Group 920 decreases down to the threshold T_RIC or lower, the terminal moves the BS registered in the Interferer Group 920 to the Interferer Candidate Group 910. However, if handover to one of the BSs registered in the Interferer Group 920 is completed, the terminal transitions to the Set Initialization & Monitoring Interferes state 900. The detailed operation will be described below.

Interference Cancellation Activation Condition
Interference cancellation is activated when there is any BS or signal source for which a difference ΔCINR between a received signal and a desired interference signal is less than a threshold and a strength of the desired interference signal exceeds an interference cancellation allow threshold T_ISD.
Interference Cancellation Release Condition Interference cancellation is released when strength of the interference signal is less than T_RIC (=T_ISD-T_IV).
Interference cancellation is released when the terminal completes handover from the serving BS to another BS.
Interference cancellation is released when the terminal should initialize the Interferer Group 920 and the Interferer Candidate Group 910 due to its failure in handover.

As shown in the drawing, in the foregoing state transition process, state transition happens when the terminal succeeds in handover or satisfies a particular condition.

Step 2-1

After the interference cancellation is activated, if a CINR difference between the interference signal (signal from the BS_B in FIG. 8; Curve 3) 830 and the interference-canceled signal (Curve 1) 810 exceeds a threshold ΔIC, the terminal attempts handover to the BS_B. The threshold ΔIC is defined as Equation (13)

$$\Delta IC = (\text{CINR of Curve 3}) - (\text{CINR of Curve 1}) \quad (13)$$

At this moment, the terminal sends a signaling message for handover to the BS_A 710 (serving BS), and then waits for a response message from the BS_A 710. The signaling message sent by the terminal can include ΔIC for each interfering BS, required by the serving BS for determining a target BS. As a result, the serving BS can determine an interfering BS whose ΔIC received from the terminal is less, as a target BS. In addition, the serving BS can transmit information on the terminal requesting the handover among the terminals in its coverage, to the target BS. A detailed description of an operation between the BSs will not be provided herein. The terminal having an internal timer starts the timer when it transmits the signaling message, and if there is no response from the BS_A 710 for a predetermined time, the terminal can initialize the timer and re-send the signaling message for handover to the serving BS_A 710.

It should be noted herein that in the prior art, as the terminal approaches a neighbor BS closer, the currently received signal (Curve 2) 820 abruptly decreases in strength due to an increase in the interference strength of the neighboring BS. In FIG. 8, this example is shown by reference numeral 820, and it is shown that the CINR decreases suddenly. However, in the exemplary embodiment of present invention, the CINR of the signal 810 interference-canceled by the interference collation operation remains relatively good. Further, in the prior art, the terminal measures, as a measure for handover, the strength of a pilot signal from a neighboring BS, currently not in communication, compares the measured strength with a predetermined threshold, and transmits information on the strength of the received signal to the serving BS using a message if the measured strength is greater than the threshold. However, in the exemplary embodiments of present invention, as can be understood from Equation (13), the terminal determines a handover time by comparing the measured strength with a strength difference between a signal from the current interfering BS and the interference-canceled signal rather than the mere pilot signal from the interfering BS, i.e. a new signal generated by the receiver through a series of complex processes. Based on this value, the terminal transmits, to the BS_A, a CINR difference ΔIC between an interference signal rather than the mere pilot signal from the neighboring BS, i.e. the signal (Curve 3) 830 from the BS_B of FIG. 8, and the interference-canceled signal (Curve 1) 810.

There are two possible cases: one case where the handover request is accepted and another case where the handover request is rejected. An interval from Reference Point 2-1 indicative of a handover attempt time to Reference Point 4 indicative of a point where detection of a received signal is impossible is defined herein as an Active Handover Region (AHOR). In the AHOR, the terminal continuously sends a message for handover to the serving BS. This corresponds to the process in which the terminal 700 delivers handover information to the BS_A 710 in FIG. 7.

A description of the above two cases will now be given below.

In the former case where the handover request is accepted, upon receipt of a handover approve message from the BS_A 710, the terminal 700 stops the service reception from the BS_A 710 and switches the service connection to the BS_B 720. In addition, the terminal 700 deregisters the BS_B 720 from the Interferer Group 920, and registers the BS_A 710 in the Interferer Candidate Group 910. An example of this operation is shown in FIG. 8. As can be understood from H/O case 1 of FIG. 8, at Reference Point 2-1, the terminal 700 completes the handover and switches its service reception from the BS_A 710 to the BS_B 720.

In the latter case where the handover request is rejected, upon failure to receive a handover approve message from the BS_A 710, the terminal 700 sends a handover request to the BS_A 710 while continuously receiving the service from the BS_A 710. At time point 2-1, the BS_B 720 remains in the Interferer Group 920 and continues activation of the interference cancellation for the BS_B 720. The terminal 700 can continuously detect a received signal from the BS_A 710 using a handover margin. Such an example corresponds to H/O case 2 or H/O case 3 of FIG. 8.

Step 3

If the strength of the interference signal continues to decrease and is less than T_RIC (=T_ISD-T_IV), the terminal 700 deregisters the BS_B 720 from the Interferer Group 920 and then moves the BS_B 720 to the Interferer Candidate Group 910. Next, the terminal 700 searches the Interferer Group 920 for the BS having the highest signal strength, determines if the searched BS is an interfering BS, and then performs the operation of Step 3. This will be described with reference to FIG. 7, by way of example. If the BS_C 730 was in the Interferer Group 920, the signal transmitted from the BS_C 730 is defined as an interference signal. If there is no interference signal in the Interferer Group 920, the terminal 700 waits until the signal source that transmits a new interference signal in the Interferer Candidate Group 910 is registered in the Interferer Group 920. Even in this period, the terminal 700 continues to receive the service from the BS_A 710.

Step 4

If the strength of the signal from the serving BS_A 710 continues to decrease and is less than a threshold T_SCD for serving cell detection, the terminal 700 registers the BS_A 710 in the Interferer Candidate Group 910. This is because there is a high possibility that the serving BS_A 710 will have the highest-strength interference signal. That is, the current situation corresponds to the case where the terminal 700 has failed in to handover. Therefore, service disconnection happens temporarily. This corresponds to H/O case 4 in FIG. 8. In this situation, because the terminal 700 does not have a BS from which it will receive service, the terminal 700 transitions to the Set Initialization & Monitoring Interferes state 900 where it starts searching for neighboring BSs, sets a BS among the neighbor BSs, from which it desires to receive the service, as a serving BS, sets the other neighboring BSs as interfering BSs, and then performs the operation of Step 1. That is, the terminal 700 updates the Interferer Candidate Group 910 and the Interferer Group 920 on the basis of the newly determined serving BS. In most cases, there is a high possibility that the interfering BS that has recently transmitted the highest-strength interference signal will be determined to be a serving BS. For example, in FIG. 8, the BS_B 720 will possibly be set as the serving BS. If the signals from the neighbor BSs are all low in strength, the BS_A 710 may be set as a serving BS again. In this case, the terminal 700 deregisters the BS_A 710 from the Interferer Candidate Group 910.

A description will now be made of each of the cases shown in FIG. 8.

In the case of FIG. 8, the terminal 700 activates an interference cancellation operation at Reference Point 2 where the strength of the signal received from the BS_B 720 is greater than or equal to T_ISD. The terminal 700 requests the handover at Reference Point 2-1 where strength of the signal from the BS_B 720 is greater than or equal to T_HO. At this time, in H/O case 1, the handover is immediately performed. In H/O case 2 and H/O case 3, the handover is performed in an Active Handover Region (AHOR) within a predetermined margin. Such cases can be considered as the same operations although there is a slight handover time difference. Therefore, until the handover is performed, the terminal 700 performs the interference cancellation operation on the signal received from the BS_B 720 that transmits the interference signal.

H/O case 4 corresponds to the case where the terminal 700 fails to handover. That is, as described above, in this case, the terminal 700 fails to receive the handover approve message from the serving BS_A 710 and can hardly receive the signal from the serving BS_A 710.

MSE-based Handover

Figure 10:
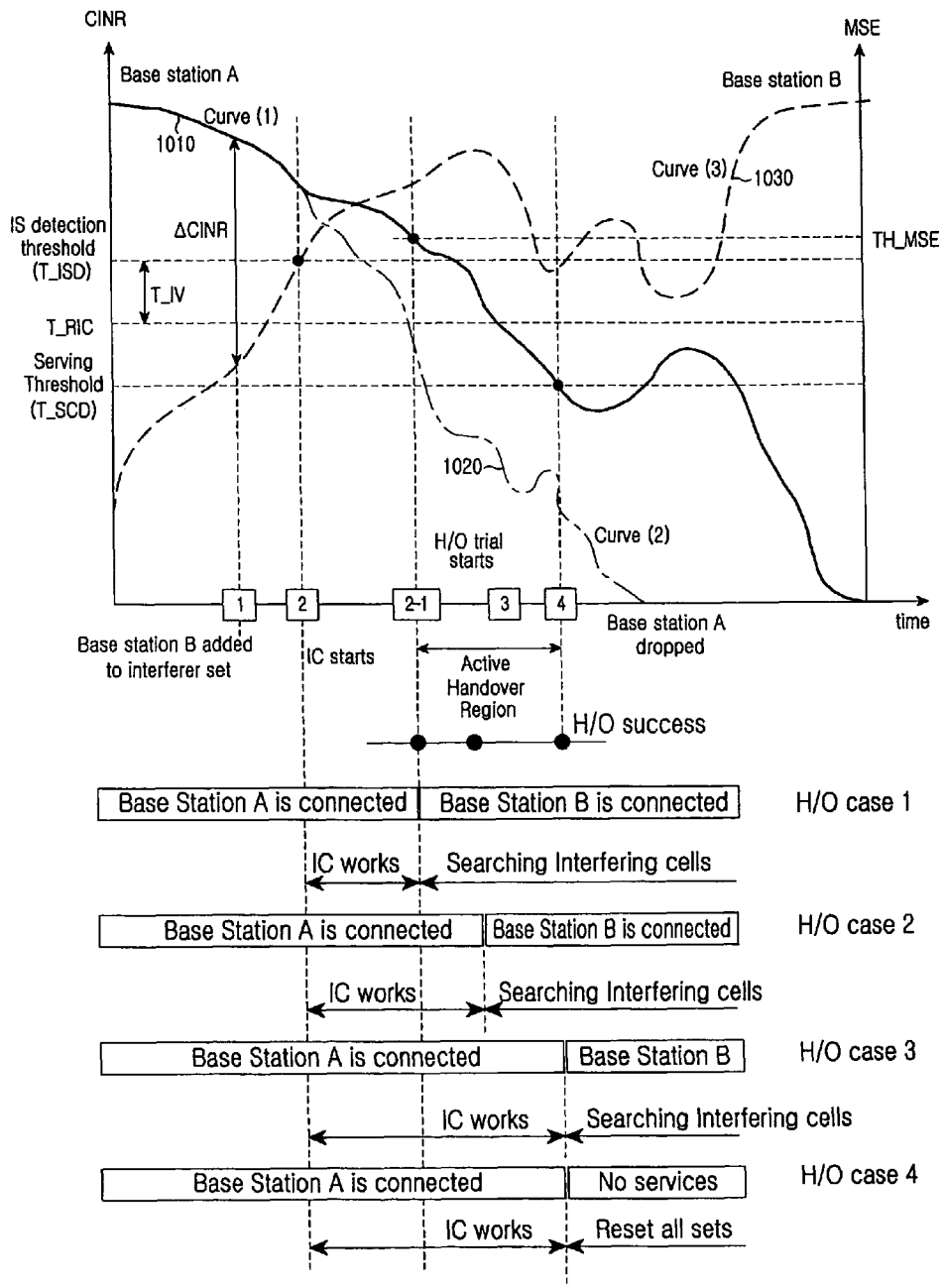
FIG. 10 is a CINR-time graph for a description of an MSE-based hard handover operation according to another exemplary embodiment of the present invention.

FIG. 10 is a CINR-time graph for a description of an MSE-based hard handover operation according to another exemplary embodiment of the present invention. With reference to FIG. 10, another exemplary embodiment of the present invention will be described below. Because the state transition is equal to that described in FIG. 9, a description of this exemplary embodiment will be made with reference to FIG. 9.

Figure 12:
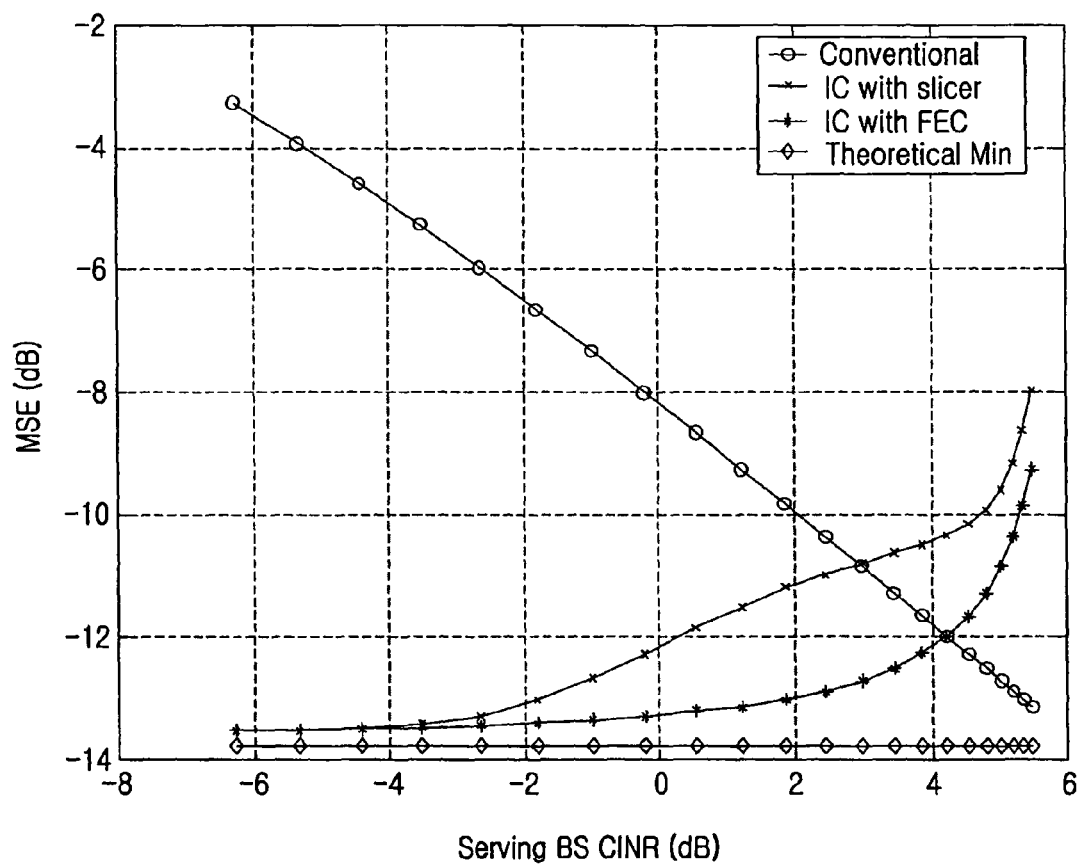
FIG. 12 is a graph illustrating a comparison in MSE performance between general receiver and an interference cancellation receiver in an AWGN channel.

It is assumed that the terminal 700 moves to the BS_B 720 while receiving a service from the BS_A 710. In this state, the terminal 700 completes handover to the BS_B 720 according to a variance in a measured CINR through the following steps, as shown in the state transition diagram of FIG. 9. Unlike the existing scheme for determining a handover time by measuring strength of a pilot signal transmitted by a neighbor BS, this scheme provides a method in which a receiver estimates an MSE measured in a constellation of a signal based on a traffic signal and the terminal attempts handover based on the estimated MSE. That is, this scheme calculates an MSE for received symbols, e.g. all samples in a MAP field of the IEEE 802.16 system or the WiBro system, and requests handover if the calculated MSE exceeds a particular threshold. This is possible because as shown in FIG. 12 below, there is a sufficient probability between the MSE and the CINR, and it is in proportion to a frame error rate (FER) of a MAP message. In addition, because the MSE is calculated using all samples in a preamble or a MAP symbol, this scheme can provide relatively accurate statistics even in one 5-msec frame. An operation of the terminal for MSE-based active handover will be described below with reference to FIG. 14.

Step 1

Initially, the terminal 700 is receiving a service from the BS_A 710, and at the same time, the terminal 700 measures signal strengths of neighboring BSs, i.e. measures a CINR of the BS_A 710 (serving BS) and a CINR of the BS_B 720 (interfering BS), and calculates a difference $\Delta$CINR between the measured CINRs. If $\Delta$CINR is less than a threshold $\Delta$CINR_TH for interferer candidate decision, the terminal 700 registers the interfering BS that transmits the interference signal, in the interferer candidate group (ICG) 910. The terminal 700 activates interference cancellation only for the BS or signal source whose signal strength exceeds an interference cancellation allow threshold T_ISD among the BSs or signal sources that transmit the interference signals. That is, the terminal 700 moves the corresponding BS to the Interferer Group 920 and then performs an interference cancellation operation thereon. This is because even though ΔCINR is less than the threshold, the received signal and the interference signal both can have very low signal strength (CINR, CIR or SNR). In this case, even though interference cancellation is activated, the interference detection failure probability increases, and performance of the received signal may decrease unexpectedly due to the wrong interference estimation.

Step 2

To avoid ambiguity of the operation described below, a definition of the interference signal will be given. The "interference signal" as used herein refers to the signal that the receiver selected for interference cancellation. Commonly, the interference signal means a signal having the highest strength or a signal for which cancellation should be considered first, among the signals in the interferer group (IG) 920. Optionally, the receiver may simultaneously cancel a plurality of interference signals. In this case, the following operation can be equally performed on each of the interference signals.

Interference cancellation is activated only for the BS or signal source whose ΔCINR is less than a threshold and whose interference signal to be canceled has a strength that exceeds an interference cancellation allow threshold T_ISD. The corresponding BS is registered in the Interferer Group 920. With the use of a threshold (T_IV) of interference variance, if the strength of the interference signal is less than T_ISD but greater than a threshold T_RIC (=T_ISD-T_IV) for release of interference cancellation, the receiver continues to activate the interference cancellation. This is because fading occurs due to a variance of the channel and movement of the terminal, so that the signal strength fluctuates instantaneously. In this case, it is generally advantageous to continue the interference cancellation in terms of average performance. In addition, it is possible to maintain the stable operation without overshoot of the controller by applying hysteresis in stead of controlling an interference canceller every time. FIG. 10 illustrates a relationship between T_RIC, T_ISD and T_IV. As shown in FIG. 10, while activation of the interference cancellation is performed at a high interference strength, release of the interference cancellation is performed at sufficiently low interference strength. In actual system implementation, a decision on T_IV can be made through field verification or simulation taking into account a Doppler frequency based on mean fading, and a variance in signal strength, and there are various other possible methods. Therefore, a detailed description thereof will not be provided herein, to avoid unnecessary limitation on the exemplary embodiments of the invention. As one extreme example, T_IV can be set to '0.0', and this means that the interference cancellation is activated or released very fast according to a variance in the interference strength.

A description will now be made of an activation condition and a release condition of the interference cancellation.

Interference Cancellation Activation Condition

Interference cancellation is activated when there is any BS or signal source for which a difference ΔCINR between a received signal and a desired interference signal is less than a threshold and strength of the desired interference signal exceeds an interference cancellation allow threshold T_ISD.

Interference Cancellation Release Condition

Interference cancellation is released when a strength of the interference signal is less than T RIC (=T_ISD-T_IV).

Interference cancellation is released when the terminal completes handover from the serving BS to another BS.

Interference cancellation is released when the terminal should initialize the Interferer Group 920 and the Interferer Candidate Group 910 due to its failure to handover.

Step 2-1

After the interference cancellation is activated, the receiver calculates an MSE every frame. The MSE, as described above, is the result obtained from a difference between the received signal and the signal transmitted by the transmitter, and means the result calculated from an interference-canceled signal (Curve 1) 1010 using Equation (12). Herein, if an MSE of a serving cell (MSE_SC), calculated by the receiver using Equation (12), exceeds a threshold TH_MSE, the terminal attempts handover to the BS_B 720. The MSE_SE is defined as Equation (14).

$$MSE_{SE} = MSE = \frac{1}{M} \sum_{m=0}^{M-1} E\{|s(m) - z(m)|^2\} \quad (14)$$

In Equation (14), s(m) denotes a decoded received signal, and z(m) denotes a signal estimated from the decoded signal. At this moment, the terminal sends a signaling message for handover to the serving BS_A 710, and then waits for a response message from the BS_A 710. The signaling message can include ΔIC or CINR for each interfering BS, required by the serving BS for determining a target BS. As a result, the serving BS can determine an interfering BS having a low ΔIC or a high CINR, as a target BS. In addition, the serving BS can transmit information on the terminal requesting the handover among the terminals in its coverage, to the target BS. A detailed description of an operation between the BSs will not be provided herein. The terminal having an internal timer starts the timer when it transmits the signaling message, and if there is no response from the BS_A 710 for a predetermined time, the terminal can initialize the timer and re-send the signaling message for handover to the serving BS_A 710.

It should be noted herein that in the conventional art, as the terminal approaches a neighboring BS, the currently received signal (Curve 2) 1020 abruptly decreases in strength due to an increase in the interference strength of the neighboring BS (Curve 3) 1030. However, in the exemplary embodiment of the present invention, the CINR of the signal 1010 interference-canceled by the interference collation operation remains relatively good. Further, in the prior art, the terminal measures, as a measure for handover, a strength of a pilot signal from a neighbor BS, currently not in communication, compares the measured strength with a predetermined threshold, and transmits information on strength of the received signal to the serving BS using a message if the measured strength is greater than the threshold. However, in the exemplary embodiment of the present invention, as shown in Equation (14), the terminal determines a handover time using the MSE calculated from the traffic symbol (MAP symbol or user data symbol) transmitted every frame, rather than the mere pilot strength of the interfering BS. The MSE, as described above, is the result obtained from a difference between the received signal and the signal transmitted by the transmitter, and means the result calculated from an interference-canceled signal (Curve 1) 1010 using Equation (12). Therefore, this scheme attempts handover using a measure totally different from that used in the conventional art.

There are two possible cases: one case where the handover request is accepted and another case where the handover request is rejected.

An interval from Reference Point 2-1 indicative of a handover attempt time to Reference Point 4 indicative of a point where detection of a received signal is impossible is defined herein as an Active Handover Region (AHOR). In the AHOR, the terminal continuously sends a message for handover to the serving BS.

In the former case where the handover request is accepted, upon receipt of a handover approve message from the BS_A 710, the terminal 700 stops the service reception from the BS_A 710 and switches the service connection to the BS_B 720. In addition, the terminal 700 deregisters the BS_B 720 from the Interferer Group 920, and registers the BS_A 710 in the Interferer Candidate Group 910. An example of this operation is shown in FIG. 10. As shown in FIG. 10, at Reference Point 2-1, the terminal 700 completes the handover and switches its service reception from the BS_A 710 to the BS_B 720. This corresponds to H/O case 1 of FIG. 10.

In the latter case where the handover request is rejected, upon failure to receive a handover approve message from the BS_A 710, the terminal 700 sends a handover request to the BS_A 710 while continuously receiving the service from the BS_A 710. At time point 2-1, the BS_B 720 remains in the Interferer Group 920 and continues activation of the interference cancellation for the BS_B 720. The terminal 700 can continuously detect a received signal from the BS_A 710 using a handover margin. Such an example corresponds to H/O case 2 or H/O case 3 of FIG. 10. That is, in H/O case 1, handover is performed immediately when handover is requested. In H/O case 2 and H/O case 3, handover is performed within a signal strength set as margin, after handover is requested.

Step 3

If the strength of the interference signal continues to decrease and is less than T_RIC (=T_ISD-T_IV), the terminal 700 deregisters the BS_B 720 from the Interferer Group 920 and then moves the BS_B 720 to the Interferer Candidate Group 910. Next, the terminal 700 searches the Interferer Group 920 for the signal source that transmits the highest-strength signal, determines the searched signal source as an interfering signal source, and then performs the operation of Step 3. For example, if the BS_C 730 was in the Interferer Group 920, the BS_C 730 is defined as a BS or signal source that transmits the interference signal. If there is no signal source that transmit the interference signal, in the Interferer Group 920, the terminal 700 waits until a BS having a new interference signal in the Interferer Candidate Group 910 is registered in the Interferer Group 920. Even in this period, the terminal 700 continues to receive the service from the BS_A 710.

Step 4

If the strength of the signal from the serving BS_A 710 continues to decrease and is less than a threshold T_SCD for serving cell detection, the terminal 700 registers the BS_A 710 in the Interferer Candidate Group 910. This is because there is a high possibility that the serving BS_A 710 will have the highest-strength interference signal up. That is, the current situation corresponds to the case where the terminal 700 has failed to handover. Therefore, service disconnection happens temporarily. This corresponds to H/O case 4 in FIG. 10.

In this situation, because the terminal 700 does not have a BS from which it will receive service, it transitions to the Set Initialization & Monitoring Interferes state 900. In this state, the terminal 700 starts searching for neighboring BSs, sets a BS among the neighboring BSs, from which it desires to receive service, as a serving BS, sets the other neighboring BSs as interfering BSs, and then performs the operation of Step 1. That is, the terminal 700 updates the Interferer Candidate Group 910 and the Interferer Group 920 on the basis of the newly determined serving BS. In most cases, there is a high possibility that the interfering BS that has recently transmitted the highest-strength interference signal will be determined as a serving BS. For example, in FIG. 10, the BS_B 720 will possibly be set as the serving BS. If the signals from the neighboring BSs are all low in strength, the BS_A 710 may be set as a serving BS again. In this case, the terminal 700 deregisters the BS_A 710 from the Interferer Candidate Group 910.

CINR-based Handover 2

Figure 11:
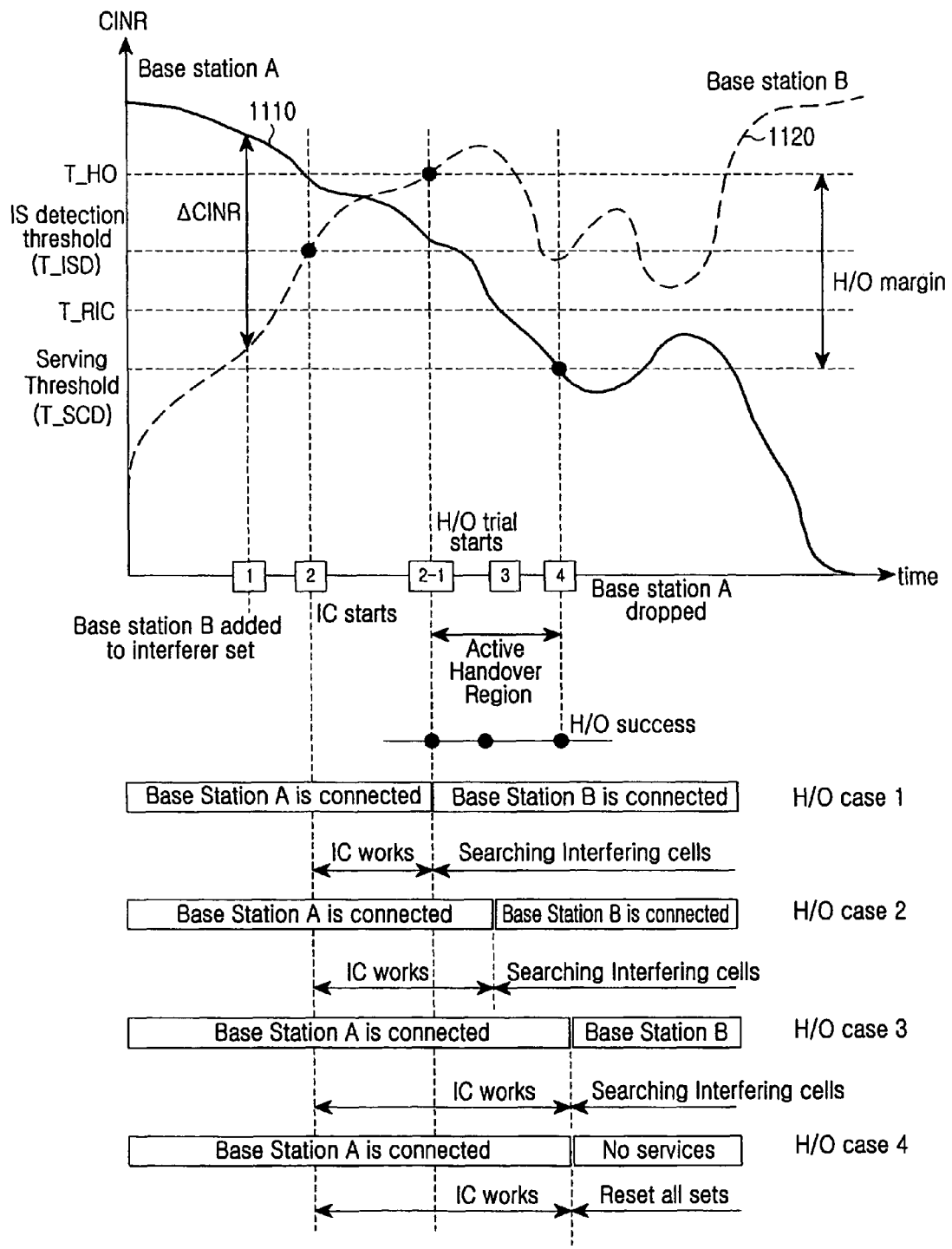
FIG. 11 is a CINR-time graph for a description of a hard handover operation according to yet another exemplary embodiment of the present invention.

FIG. 11 is a CINR-time graph for a description of a hard handover operation according to yet another exemplary embodiment of the present invention. With reference to FIG. 11, yet another exemplary embodiment of the present invention will be described below. Because the state transition is equal to that described in FIG. 9, a description of this exemplary embodiment will be made with reference to FIG. 9.

It is assumed that the terminal 700 moves to the BS_B 720 while receiving a service from the BS_A 710. In this state, the terminal 700 completes handover to the BS_B 720 according to a variance in a measured CINR through the following steps, as shown in FIG. 11.

Step 1

Initially, the terminal 700 is receiving a service from the BS_A 710, and at the same time, the terminal 700 measures signal strengths of neighbor BSs, i.e. measures a CINR of the BS_A 710 (serving BS) 1110 and a CINR of the BS_B 720 (interfering BS) 1120, and calculates a difference $\Delta$CINR between the measured CINRs. If $\Delta$CINR is less than a threshold $\Delta$CINR_TH for interferer candidate decision, the terminal 700 registers the interfering BS that transmits the interference signal, in the interferer candidate group (ICG) 910. The terminal 700 activates interference cancellation only for the BS or signal source whose signal strength exceeds an interference cancellation allow threshold T_ISD among the BSs or signal sources that transmit the interference signals. The reason for activating interference cancellation only for the BS or signal source that transmits a signal whose strength is higher than or equal to a particular value is because even though $\Delta$CINR is less than the threshold, the received signal and the interference signal both can have very low signal strength (CINR, CIR or SNR). In this case, even though interference cancellation is activated, the interference detection failure probability increases, and performance of the received signal may decrease unexpectedly due to the wrong interference estimation.

Step 2

To avoid ambiguity of the operation described below, a definition of the interference signal will be given. The "interference signal" as used herein refers to the signal that the receiver selected for interference cancellation. Commonly, the interference signal means a signal having the highest strength or a signal for which cancellation should be considered first, among the signals in the interferer group (IG) 920. Optionally, the receiver may simultaneously cancel a plurality of interference signals. In this case, the following operation can be equally performed on each of the interference signals.

Interference cancellation is activated only for the BS or signal source whose ΔCINR is less than a threshold and whose interference signal to be canceled has a strength that exceeds an interference cancellation allow threshold T_ISD. The corresponding BS is registered in the Interferer Group 920. With the use of a threshold (T_IV) of interference variance, if the strength of the interference signal is less than T_ISD but greater than a threshold T_RIC (=T_ISD-T_IV) for release of interference cancellation, the receiver continues to activate the interference cancellation. This is because fading occurs due to a variance of the channel and movement of the terminal, so that the signal strength fluctuates instantaneously. In this case, it is generally advantageous to continue the interference cancellation in terms of average performance. In addition, it is possible to maintain the stable operation without overshoot of the controller by applying hysteresis instead of controlling an interference canceller every time. Although a timer is generally used for the hysteresis operation, the exemplary embodiments of the present invention, as it aims to provide interference cancellation, applies a hysteresis operation based on signal strength. However, the exemplary embodiment of the present invention can also perform the hysteresis operation using the timer.

FIG. 11 illustrates a relationship between T_RIC, T_ISD and T_IV. As shown in FIG. 11, while activation of the interference cancellation is performed at a high interference strength, release of the interference cancellation is performed at sufficiently low interference strength. In actual system implementation, a decision on T_IV can be made through field verification or simulation taking into account a Doppler frequency based on mean fading, and a variance in signal strength, and there are various other possible methods. Therefore, a detailed description thereof will not be provided herein, to avoid unnecessary limitation on the exemplary embodiments of the invention. As one extreme example, T_IV can be set to '0.0', and this means that the interference cancellation is activated or released very fast according to a variance in the interference strength.

Interference Cancellation Activation Condition

Interference cancellation is activated when there is any BS or signal source for which a difference ΔCINR between a received signal and a desired interference signal is less than a threshold and strength of the desired interference signal exceeds an interference cancellation allow threshold T_ISD.

Interference Cancellation Release Condition

Interference cancellation is released when strength of the interference signal is less than T_RIC (=T_ISD-T_IV).

Interference cancellation is released when the terminal completes handover from the serving BS to another BS.

Interference cancellation is released when the terminal should initialize the Interferer Group 920 and the Interferer Candidate Group 910 due to its failure in handover.

Step 2-1

After the interference cancellation is activated, if a strength of an interference signal 1120 exceeds a threshold T_HO for handover trial, the terminal attempts handover to the BS_B 720. That is, the terminal sends a signaling message for handover to the BS_A 710, and then waits for a response message from the BS_A 720. Herein, there are two possible cases: one case where the handover request is accepted and another case where the handover request is rejected. For reference, the conventional soft handover technique starts handover by determining priority of two signals for the following reason. That is, because sufficient performance improvement of the received signal is possible by soft combining two BSs BS_A and BS_B, it is not so important to determine a strength of each signal. That is, handover can be performed at an appropriate time. On the contrary, the exemplary embodiment of the present invention performs handover without soft combining. Therefore, the terminal should attempt handover in the situation where strength of the signal from a desired target BS can sufficiently guarantee successful reception. That is, the exemplary embodiment of the present invention is different from the conventional art in that the terminal compares an absolute signal strength of the desired target BS rather than the relative difference, with the threshold T_HO, and activates handover according to the comparison result. An interval from Reference Point 2-1 indicative of a handover attempt time to Reference Point 4 indicative of a point where detection of a received signal is impossible is defined herein as an Active Handover Region (AHOR). In the AHOR, the terminal continuously sends a message for handover to the serving BS.

A description of the above two cases will now be given below.

In the former case where the handover request is accepted, upon receipt of a handover approve message from the BS_B 720, the terminal 700 stops the service reception from the BS_A 710 and switches the service connection to the BS_B 720. In addition, the terminal 700 deregisters the BS_B 720 from the Interferer Group 920, and registers the BS_A 710 in the Interferer Candidate Group 910. An example of this operation is shown in FIG. 11. As shown in FIG. 11, at Reference Point 2-1, the terminal 700 completes the handover and switches its service reception from the BS_A 710 to the BS_B 720. This corresponds to H/O case 1 of FIG. 11.

In the latter case where the handover request is rejected, upon failure to receive a handover approve message from the BS_B 720, the terminal 700 sends a handover request to the BS_B 720 while continuously receiving the service from the BS_A 710. At time point 2-1, the BS_B 720 remains in the Interferer Group 920 and continues activation of the interference cancellation for the BS_B 720. The terminal 700 can continuously detect a received signal from the BS_A 710 using a handover margin corresponding to T_HO-T_SCD. Such an example corresponds to H/O case 2 or H/O case 3 of FIG. 11. That is, in H/O case 1, handover is performed immediately when handover is requested. In H/O case 2 and H/O case 3, handover is performed within a predetermined margin, after handover is requested.

Step 3

If the strength of the interference signal continues to decrease and is less than T_RIC (=T_ISD-T_IV), the terminal 700 deregisters the BS_B 720 from the Interferer Group 920 and then moves the BS_B 720 to the Interferer Candidate Group 910. Next, the terminal 700 searches the Interferer Group 920 for the signal source that transmits the highest-strength signal, determines the searched signal source as an interfering signal source, and then performs the operation of Step 3. For example, if the BS_C 730 was in the Interferer Group 920, the BS_C 730 is defined as a BS or signal source that transmits the interference signal. If there is no signal source that transmit the interference signal, in the Interferer Group 920, the terminal 700 waits until a BS having a new interference signal in the Interferer Candidate Group 910 is registered in the Interferer Group 920. Even in this period, the terminal 700 continues to receive the service from the BS_A 710.

Step 4

If the strength of the signal from the serving BS_A 710 continues to decrease and is less than a threshold T_SCD for serving cell detection, the terminal 700 registers the BS_A 710 in the Interferer Candidate Group 910. This is because there is a high possibility that the serving BS_A 710 will have the highest-strength interference signal. That is, the current situation corresponds to the case where the terminal 700 has failed to handover. Therefore, service disconnection happens temporarily. This corresponds to H/O case 4 in FIG. 11. In this situation, because the terminal 700 does not have a BS from which it will receive service, it transitions to the Set Initialization & Monitoring Interferes state 900. In this state, the terminal 700 starts searching for neighboring BSs, sets a BS among the neighboring BSs, from which it desires to receive service, as a serving BS, sets the other neighboring BSs as interfering BSs, and then performs the operation of Step 1. That is, the terminal 700 updates the Interferer Candidate Group 910 and the Interferer Group 920 on the basis of the newly determined serving BS. In most cases, there is a high possibility that the interfering BS that has recently transmitted the highest-strength interference signal will be determined as a serving BS. For example, in FIG. 11, the BS_B 720 will possibly be set as the serving BS. If the signals from the neighbor BSs are all low in strength, the BS_A 710 may be set as a serving BS again. In this case, the terminal 700 deregisters the BS_A 710 from the Interferer Candidate Group 910.

A description will now be made of a system and its terminal to which an interference cancellation technique is applied according to an exemplary embodiment of the present invention.

Figure 13:
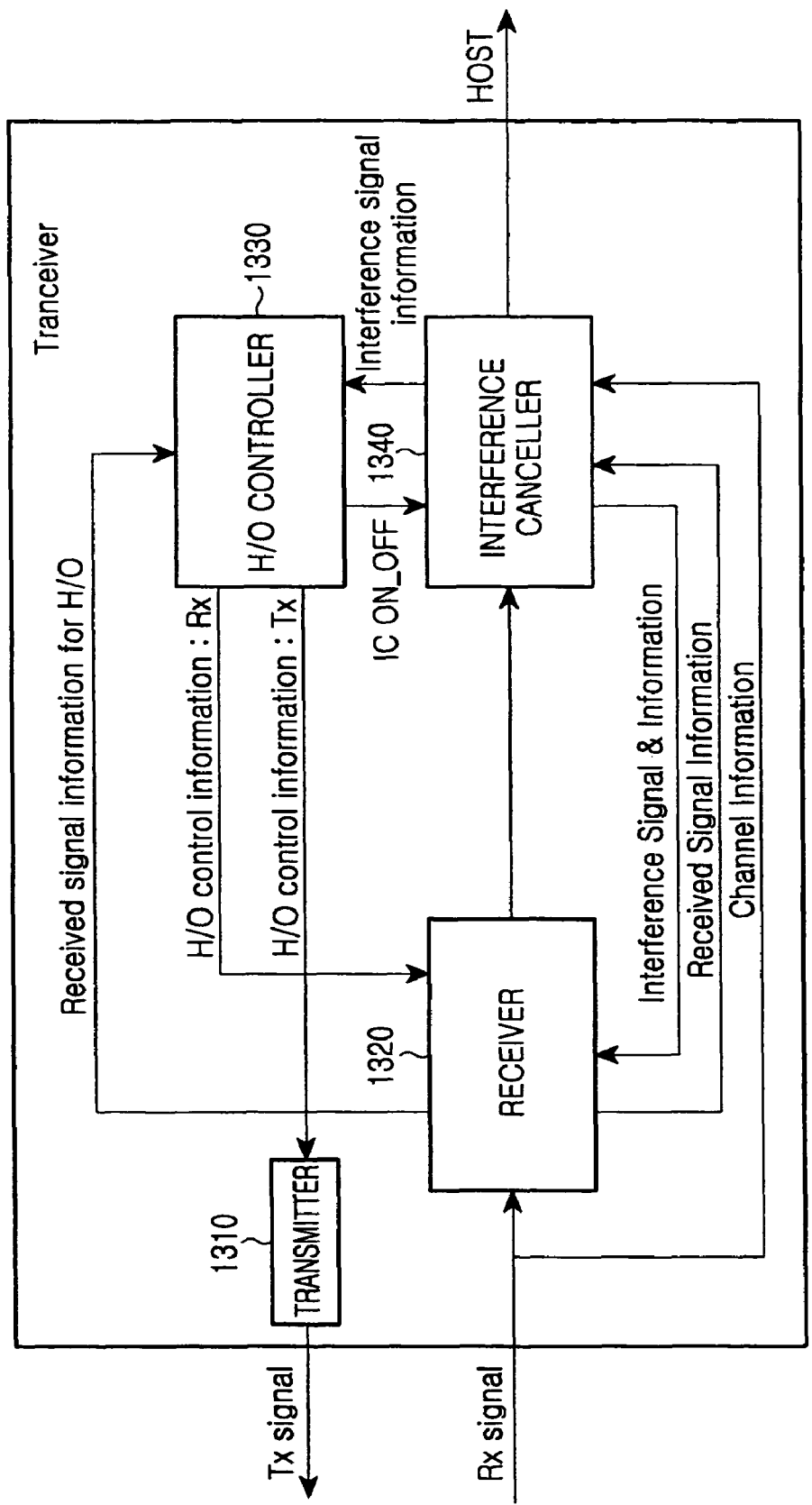
FIG. 13 is a diagram illustrating architecture of a system to which an interference cancellation technique is applied according to an exemplary embodiment of the present invention.

FIG. 13 is a diagram illustrating architecture of a system to which an interference cancellation technique is applied according to an exemplary embodiment of the present invention.

A receiver 1320 acquires a variety of information from a received signal. That is, the receiver 1320 extracts, from a control channel, control information, signaling information for handover, and received signal information. An interference canceller 1340 acquires channel information from the received signal, and provides interference signal information to a handover controller 1330. Then the handover controller 1330 determines whether there is a need for handover, using the information received from the interference canceller 1340. If there is a need for handover, the handover controller 1330 should receive the necessary handover information, for example, a signal received from a neighbor BS and a handover command signal received from a serving BS, via the receiver 1320. In addition, if there is a need for handover, the handover controller 1330 sends a handover request signal to the serving BS and provides strength information of the signals received from neighboring BSs to a transmitter 1310 so as to transmit the strength information to the serving BS. Moreover, the handover controller 1330 determines up to which point it should perform interference cancellation according to an exemplary embodiment of the present invention, generates an interference cancellation_on/off (IC ON/OFF) signal depending on the determination result, and outputs the IC ON/OFF signal to the receiver 1320. Besides, when the handover is performed, the handover controller 1330 controls the receiver 1320 so as to receive the signal from the serving BS and the signal from the target BS. The transmitter 1310 transmits not only the signal that a terminal will transmit to a BS, but also the handover request message provided from the handover controller 1330 according to an exemplary embodiment of the present invention.

Figure 14:
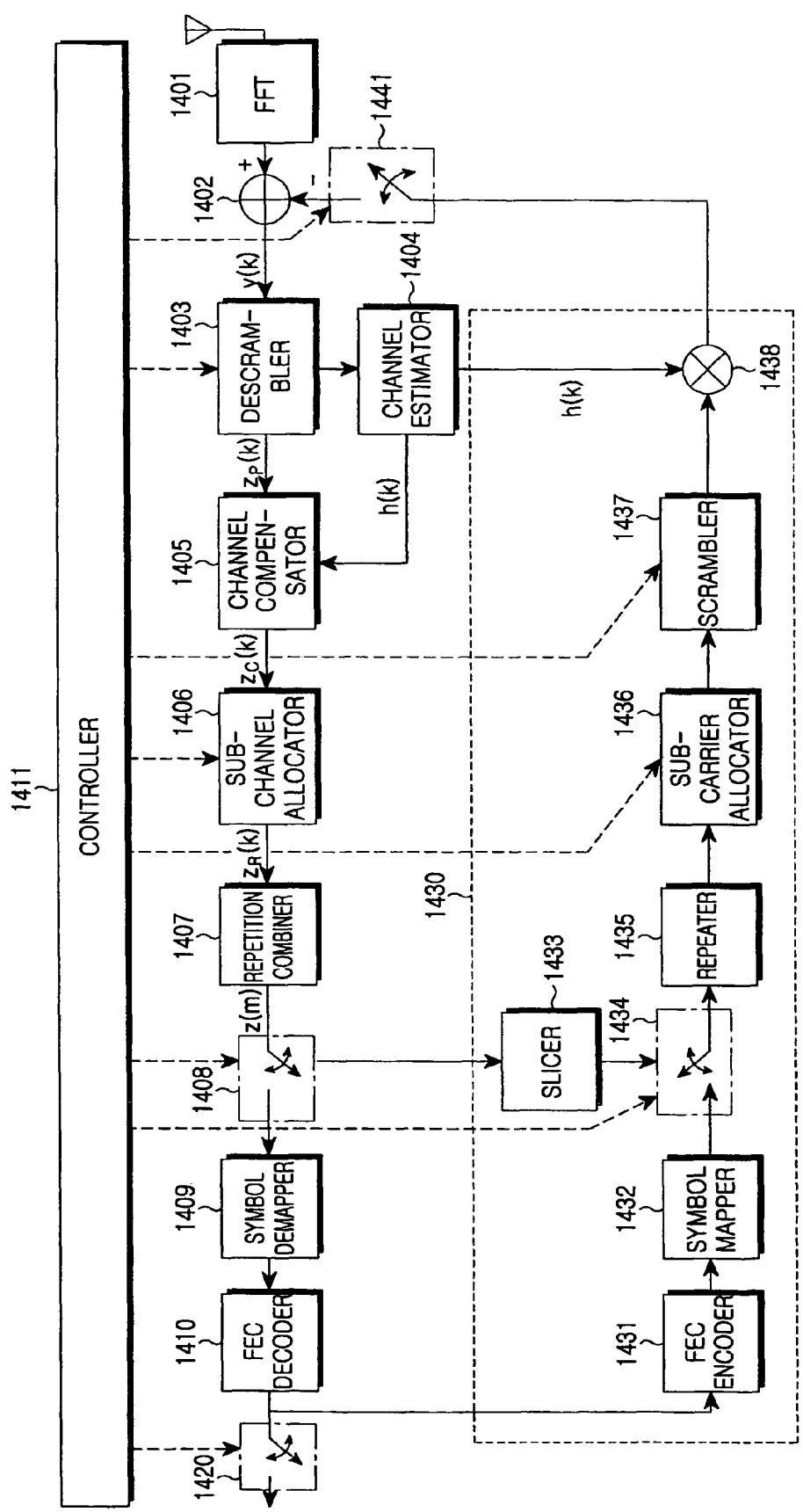
FIG. 14 is a block diagram illustrating a structure of an interference cancellation receiver for performing handover according to an exemplary embodiment of the present invention.

With reference to FIG. 14, a further description will now be made of a structure and operation of a receiver for interference cancellation according to an exemplary embodiment of the present invention.

FIG. 14 is a block diagram illustrating a structure of an interference cancellation receiver for performing handover according to an exemplary embodiment of the present invention. With reference to FIG. 14, a description will now be made of a structure and operation of a receiver for performing interference cancellation according to an exemplary embodiment of the present invention.

The receiver according to an exemplary embodiment of the present invention includes a controller 1411, a received signal processor for processing a received signal, and an interference canceller 1430. The receiver has a general structure for receiving and processing OFDMA symbols. That is, the structure is generally equal to the structure of FIG. 6, except for the interference canceller 1430 which is modified according to an exemplary embodiment of the present invention.

A process of receiving a signal from a BS has been described above. Therefore, a detailed description of the blocks 1401 to 1410 will not be provided. However, the receiver further includes a first switch 1441 for canceling interference according to an exemplary embodiment of the present invention, and an adder 1402 for calculating a difference between the signal output from the first switch 1441 and the signal output from an FFT 1401. In addition, the receiver includes a second switch 1408 for connecting/disconnecting a path between a repetition combiner 1407 and a symbol demapper 1409, and a third switch 1420 for connecting/disconnecting the output of an FEC decoder 1410. Additionally, the receiver includes descrambler 1403, channel compensator 1405 and sub-channel allocator 1406.

A description of the receiver will now be made mainly for the controller 1411 and the interference canceller 1430. For the interference cancellation, an exemplary embodiment of the present invention provides a process of regenerating a transmission signal using a decoded symbol. That is, an FEC encoder 1431, a symbol mapper 1432, a repeater 1435, a sub-carrier allocator 1436, and a scrambler 1437 correspond to the conventional transmitter of FIG. 5. The above elements regenerate a transmission symbol by performing the same operation as that performed in the transmitter. Compared with the conventional interference canceller, the interference canceller 1430 further includes a slicer 1433, and a fourth switch 1434 between the symbol mapper 1432 and the repeater 1435, for switching an output of the slicer 1433 and an output of the symbol mapper 1432.

For interference detection, the controller 1411 detects an interference signal using an identifier (ID) of a neighbor BS from which an interference signal is received. The interference signal is detected by a CINR measurer (not shown). The controller 1411 measures strengths of interference signals from neighbor BSs using the CINR measurer, and if the measured strengths satisfy a specific condition, the controller 1411 controls the interference canceller 1430 so as to cancel the interference signals. The specific condition, as described above, corresponds to the active handover condition according to an exemplary embodiment of the present invention.

The slicer 1433 is optional. The controller 1411 measures CINRs of neighboring BSs, and if the measured CINRs are greater than or equal to a particular threshold, the controller 1414 allows the corresponding signals to pass the slicer 1433. Otherwise, the controller 1411 regenerates an interference signal using the FEC encoder 1431. Therefore, for a high-CINR interference signal, because there is almost no error in a constellation of the signal that has passed the slicer 1433, there is a rare performance difference between the FEC method and the slicer method. Thus, this exemplary embodiment can use only the merits of the FEC method and the slicer method.

The controller 1411 multiplies the regenerated interference signal via multiplier 1438 by an estimated channel value output from a channel estimator 1404. If the first switch 1441 is connected, the adder 1402 can cancel an interference signal among the signals output from the FFT 1401. Finally, an interference-canceled pure signal can be obtained by subtracting the regenerated interference signal from the received signal. With the use of the interference-canceled received signal, the receiver can detect its signal using an ID of the serving BS according to the existing OFDMA reception scheme. The controller 1411 controls such a signal flow. The controller 1411 can use the BS ID in identifying the signal from the neighbor BS and the signal from the serving BS.

The receiver can be constructed to cancel the interference signals using many other methods. Exemplary embodiments of the present invention place no restriction on the interference cancellation techniques.

Figure 15A:
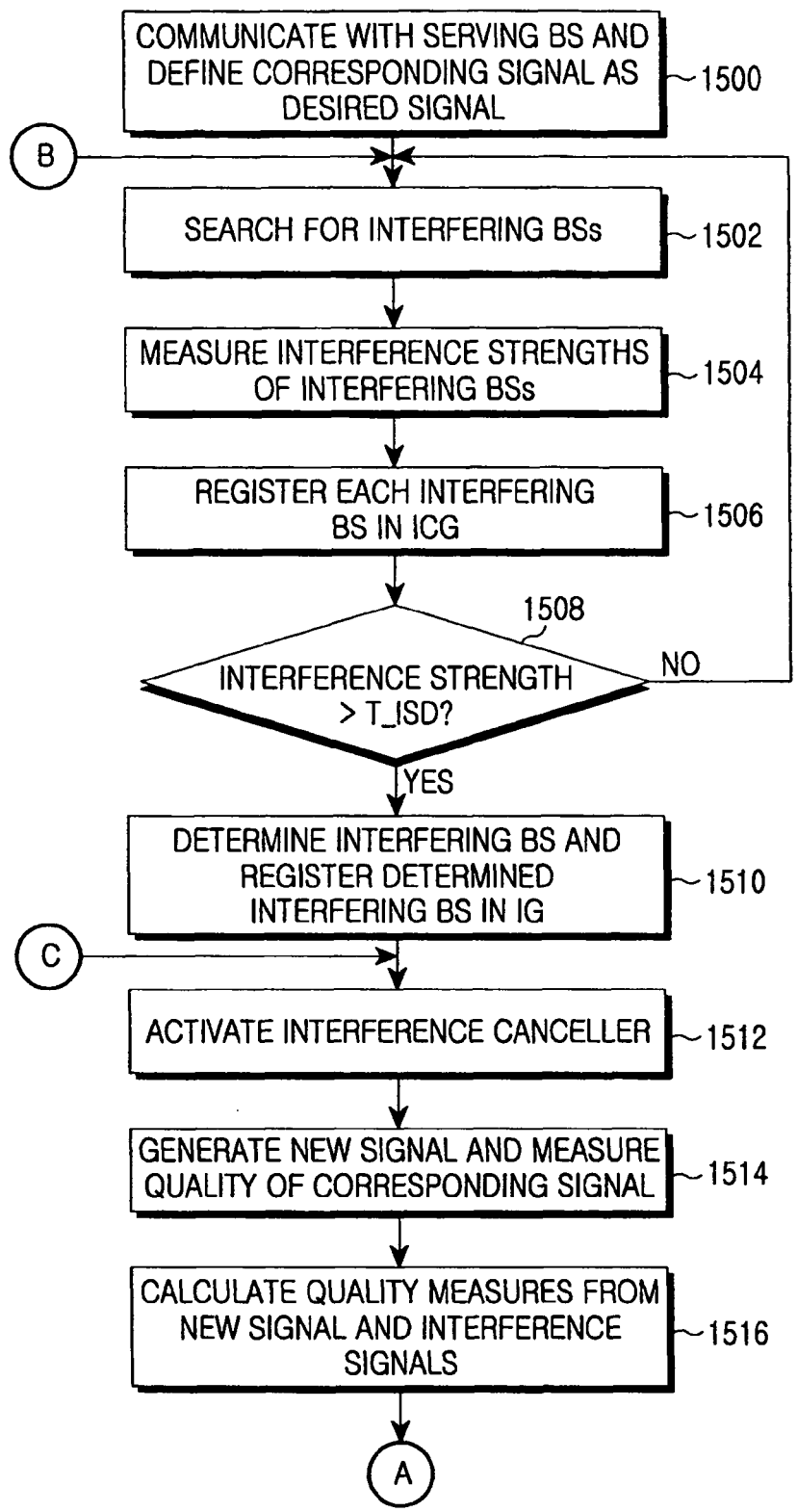
FIGS. 15A and 15B are flowcharts illustrating an active handover operation in a terminal according to an exemplary embodiment of the present invention.
Figure 15B:
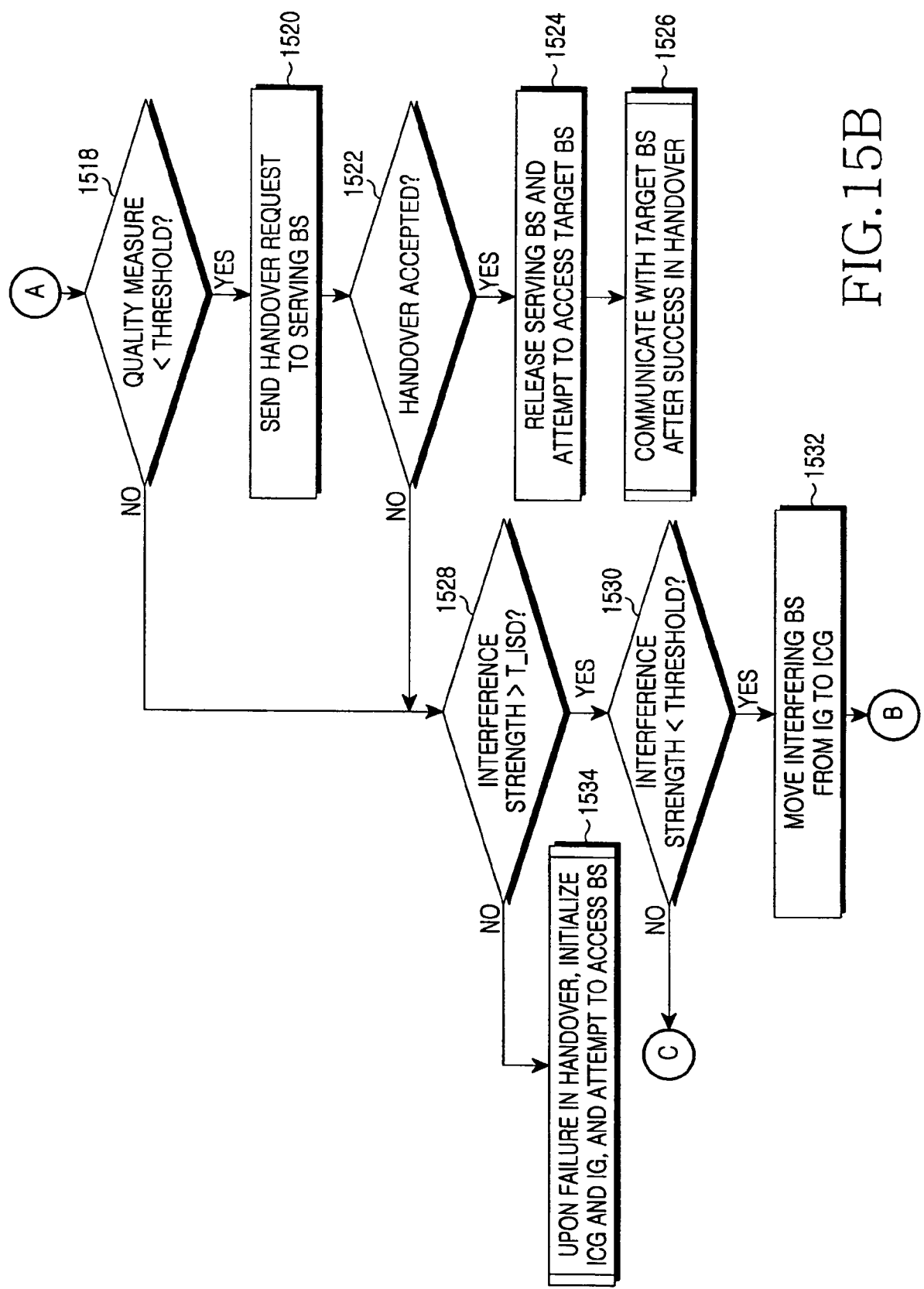

FIGS. 15A and 15B are flowcharts illustrating an active handover operation in a terminal according to an exemplary embodiment of the present invention. With reference to FIGS. 15A and 15B, a description will now be made of a process in which active handover is performed in a terminal according to an exemplary embodiment of the present invention.

In step 1500, the terminal communicates with a serving BS, and defines a corresponding signal as a desired signal. In step 1502, the terminal searches for interfering BSs. The search for the interfering BSs can be achieved according to a variance in SINR, SIR or CIR, as described above. After the search for the interfering BSs, the terminal measures interference strength for each of the interfering BSs in step 1504, in order to determine whether there is a need for interference cancellation or handover according to the exemplary embodiments of the present invention. After the measurement of interference strength, the terminal registers each of the interfering BSs in an interferer candidate group (ICG) in step 1506. The terminal determines in step 1508 whether interference strength of an interfering BS in the ICG is greater than T_ISD. If it is determined that the interference strength of an interfering BS in the ICG is greater than T_ISD, the terminal proceeds to step 1510. Otherwise, the terminal returns to step 1502.

In step 1510, the terminal determines an interfering BS for interference cancellation, and registers the determined interfering BS in an interferer group (IG). Thereafter, in step 1512, the terminal activates an interference canceller to cancel the interference signal.

After canceling the interference signal, the terminal proceeds step 1514 where it generates a new signal and measures the quality of the generated signal. Thereafter, in step 1516, the terminal calculates quality measurements from the new signal and the interference signals. After the calculation of the quality measurements, the terminal determines in step 1518 whether the quality measurement is less than a given threshold. If the quality measurement is less than a given threshold, the terminal proceeds to step 1520.

In step 1520, the terminal sends a handover request to the serving BS. Thereafter, the terminal determines in step 1522 whether a handover accept (approve) message is received from the serving BS. Upon receipt of the handover accept message, the terminal proceeds to step 1524 where it releases the serving BS and attempts to access a target BS. Thereafter, in step 1526, the terminal can communicate with the target BS after success in the handover. Through this process, seamless handover is possible.

However, after step 1518 or 1522, the terminal determines in step 1528 whether interference strength of an interfering BS in the ICG is greater than T_ISD. If it is determined that the interfering BS in the ICG is greater than T_ISD, the terminal proceeds to step 1530. Otherwise, the terminal proceeds to step 1534 where it initializes the ICG and the IG and attempts to access a new BS because handover has failed.

However, in step 1530, the terminal determines whether the strength of the interference signal is less than a threshold. If it is determined that the strength of the interference signal is less than a threshold, the terminal proceeds to step 1532 where it moves the interfering BS from the IG to the ICG, and then returns to step 1502. However, if the strength of the interference signal is not less than the threshold, the terminal proceeds to step 1512.

As can be understood from the foregoing description, the use of the handover according to the exemplary embodiments of the present invention can reduce a waste of bandwidth in the wireless communication system, and can safely transmit control signals. In addition, the handover is performed stably, thereby contributing to the prevention of the QoS reduction and to an increase in the system throughput.

While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A hard handover method performed by a mobile terminal in a wireless communication system including a serving base station (BS) currently serving the mobile terminal and at least one neighboring BS, the mobile terminal located within both a border of a cell served by the serving BS and a border of a cell served by the at least one neighboring BS, the method comprising:

checking, by the mobile terminal, a signal-to-noise ratio (SNR) of an interference signal received from the at least one neighboring BS while in communication with the serving BS, and canceling, by the mobile terminal, from a signal received from the serving BS, interference caused by the interference signal received from the at least one neighboring BS, to generate an interference-canceled signal if, upon using an operation, it is determined that the SNR of the interference signal received from the at least one neighboring BS satisfies a select condition;

sending, by the mobile terminal, a handover request to the serving BS, if a difference between an SNR of the interference-canceled signal and the SNR of the interference signal received from the at least one neighboring BS reaches a handover request threshold; and upon receipt of a handover approval from the serving BS, releasing, by the mobile terminal, a communication channel to the serving BS, and connecting, by the mobile terminal, a call to the at least one neighboring BS that provides the interference signal whose SNR has satisfied the select condition;

wherein the operation used for determining whether the SNR of the interference signal received from the at least one neighboring BS satisfies the select condition comprises:

registering, in an interferer candidate group (ICG), any neighboring BS if a difference between an SNR of the signal received from the serving BS and an SNR of a signal received from the neighboring BS is within a select threshold;

registering, in an interferer group (IG), any BS that transmits a signal having a higher strength than a threshold for interference cancellation among signals received from BS(s) registered in the ICG; and canceling interference caused by a signal received from each of BS(s) registered in the IG.

2. The hard handover method of claim 1, wherein the handover request includes a difference between the SNR of the interference-canceled signal and the SNR of the interference signal received from each of the at least one neighboring BS.

3. The hard handover method of claim 1, further comprising deregistering a corresponding BS from the IG and registering the corresponding BS in the ICG, if an SNR of a signal received from the corresponding BS registered in the IG is lower than a threshold of interference variance.

4. The hard handover method of claim 1, wherein if an SNR of a signal received from a BS registered in the IG decreases within a range of a threshold of interference variance, the BS registered in the IG remains in the IG and interference cancellation by the signal received from the BS registered in the IG is maintained.

5. The hard handover method of claim 1, wherein a threshold of interference variance is determined by simulating a variance in a Doppler frequency based on mean fading, and a variance in a signal strength.

6. The hard handover method of claim 1, further comprising registering the serving BS in the ICG when the handover is completed.

7. The hard handover method of claim 1, further comprising:
completing the handover if a handover approval is not received until a strength of the signal received from the serving BS decreases lower than a threshold of serving cell detection; and
performing an initialization setting for searching for a new serving BS.

8. A hard handover method performed by a mobile terminal in a wireless communication system including a serving base station (BS) currently serving the mobile terminal and at least one neighboring BS, the mobile terminal located within both a border of a cell served by the serving BS and a border of a cell served by the at least one neighboring BS, the method comprising:
checking, by the mobile terminal, a signal-to-noise ratio (SNR) of an interference signal received from the at least one neighboring BS while in communication with the serving BS, and canceling, by the mobile terminal, from a signal received from the serving BS, interference caused by the interference signal received from the at least one neighboring BS to generate an interference-canceled signal if, upon using an operation, it is determined that the SNR of the interference signal received from the at least one neighboring BS satisfies a select condition;
estimating, by the mobile terminal, a transmitted symbol from a symbol demodulated during an interference cancellation, and calculating an energy difference between the demodulated symbol and the estimated symbol;
sending, by the mobile terminal, a handover request to the serving BS, if the energy difference reaches a handover request threshold; and
upon receipt of a handover approval from the serving BS, releasing, by the mobile terminal, a communication channel to the serving BS, and connecting, by the mobile terminal, a call to the at least one neighboring BS that provides the interference signal whose SNR has satisfied the select condition;
wherein the operation used for determining whether the SNR of the interference signal received from the at least one neighboring BS satisfies the select condition comprises:
registering, in an interferer candidate group (ICG), any neighboring BS if a difference between an SNR of the signal received from the serving BS and an SNR of a signal received from the neighboring BS is within a select threshold;
registering, in an interferer group (IG), any BS that transmits a signal having a higher strength than a threshold for interference cancellation among signals received from BS(s) registered in the ICG; and
canceling interference caused by a signal received from each of BS(s) registered in the IG.

9. The hard handover method of claim 8, wherein the handover request includes a difference between an SNR of the interference-canceled signal and the SNR of the interference signal received from each of the at least one neighboring BS.

10. The hard handover method of claim 8, further comprising deregistering a corresponding BS from the IG and registering the corresponding BS in the ICG, if an SNR of a signal received from the corresponding BS registered in the IG is lower than a threshold of interference variance.

11. The hard handover method of claim 8, wherein if an SNR of a signal received from a BS registered in the IG decreases within a range of a threshold of interference variance, the BS registered in the IG remains in the IG and interference cancellation by the signal received from the BS registered in the IG is maintained.

12. The hard handover method of claim 8, wherein a threshold of interference variance is determined by simulating a variance in a Doppler frequency based on mean fading, and a variance in a signal strength.

13. The hard handover method of claim 8, further comprising registering the serving BS in the ICG when the handover is completed.

14. The hard handover method of claim 8, further comprising:
completing the handover if a handover approval is not received until a strength of the signal received from the serving BS decreases lower than a threshold of serving cell detection; and
performing initialization setting for searching for a new serving BS.

15. A hard handover method performed by a mobile terminal in a wireless communication system including a serving base station (BS) currently serving the mobile terminal and at least one neighboring BS, the mobile terminal located within both a border of a cell served by the serving BS and a border of a cell served by the at least one neighboring BS, the method comprising:
checking, by the mobile terminal, a signal-to-noise ratio (SNR) of an interference signal received from the at least one neighboring BS while in communication with the serving BS, and canceling, by the mobile terminal, from a signal received from the serving BS, interference caused by the interference signal received from the at least one neighboring BS to generate an interference-canceled signal if, upon using an operation, it is determined that the SNR of the interference signal received from the at least one neighboring BS satisfies a select condition;
sending, by the mobile terminal, a handover request to the serving BS, if an SNR of the interference signal received from the at least one neighboring BS reaches a threshold for handover trial during an interference cancellation; and upon receipt of a handover approval from the serving BS, releasing, by the mobile terminal, a communication channel to the serving BS, and connecting, by the mobile terminal, a call to the at least one neighboring BS that provides the interference signal whose SNR has satisfied the select condition;

wherein the operation used for determining whether the SNR of the interference signal received from the least one neighboring BS satisfies the select condition comprises:

registering, in an interferer candidate group (ICG), any neighboring BS if a difference between an SNR of the signal received from the serving BS and an SNR of a signal received from the neighboring BS is within a select threshold;

registering, in an interferer group (IG), any BS that transmits a signal having a higher strength than a threshold for interference cancellation among signals received from BS(s) registered in the ICG; and canceling interference caused by a signal received from each of BS(s) registered in the IG.

16. The hard handover method of claim 15, wherein the handover request includes a difference between an SNR of the interference-canceled signal and the SNR of the interference signal received from each of the at least one neighboring BS.

17. The hard handover method of claim 15, further comprising deregistering a corresponding BS from the IG and registering the corresponding BS in the ICG, if an SNR of a signal received from the corresponding BS registered in the IG is lower than a threshold of interference variance.

18. The hard handover method of claim 15, wherein if an SNR of a signal received from a BS registered in the IG decreases within a range of a threshold of interference variance, the BS registered in the IG remains in the IG and interference cancellation by the signal received from the BS registered in the IG is maintained.

19. The hard handover method of claim 15, wherein a threshold of interference variance is determined by simulating a variance in a Doppler frequency based on mean fading, and a variance in a signal strength.

20. The hard handover method of claim 15, further comprising registering the serving BS in the ICG when the handover is completed.

21. The hard handover method of claim 15, further comprising:

completing the handover if a handover approval is not received until a strength of the signal received from the serving BS decreases lower than a threshold of serving cell detection; and performing initialization setting for searching for a new serving BS.

22. A hard handover apparatus in a wireless communication system, comprising:

a receiver for estimating a channel from at least one base station (BS), and converting a signal received from a serving BS into data while receiving signals from BSs using the channel estimation information;

an interference signal generator for generating a signal of a particular interfering BS among signals processed by the receiver, and generating an interference signal using the channel estimation information;

a transmitter for performing transmission of a signal and a control message to be transmitted to a BS; and a controller for:

controlling the interference signal generator so as to cancel an interference signal, if, upon using an operation, it is determined that a strength of a signal received from each of interfering BSs among the BSs satisfies an interference cancellation condition;

generating a handover request message and controlling transmission of the handover request message to the serving BS by controlling the transmitter, if a strength of a signal received from a particular BS among the neighboring BSs satisfies a handover condition during the interference cancellation; and upon receipt of a handover approval from the serving BS, controlling a release of a communication channel to the serving BS and controlling a connection of a call to the particular BS;

wherein the operation used for determining whether a strength of a signal received from each of interfering BSs among the BSs satisfies the interference cancellation condition comprises:

registering, in an interferer candidate group (ICG), any neighboring BS if a difference between an SNR of the signal received from the serving BS and an SNR of a signal received from the neighboring BS is within a select threshold;

registering, in an interferer group (IG), any BS that transmits a signal having a higher strength than a threshold for interference cancellation among signals received from BS(s) registered in the ICG; and canceling interference caused by a signal received from each of BS(s) registered in the IG.

23. The hard handover apparatus of claim 22, wherein the handover condition is satisfied when a difference between an SNR of a interference-canceled signal and an SNR of the interference signal exceeds a select threshold.

24. The hard handover apparatus of claim 22, wherein a transmitted symbol is estimated from a symbol demodulated during the interference cancellation, and the handover condition is satisfied when an energy difference between the demodulated symbol and the estimated symbol exceeds a select threshold.

25. The hard handover apparatus of claim 22, wherein the handover condition is satisfied when an SNR of a signal received from each of neighbor BSs exceeds a select threshold.

26. The hard handover apparatus of claim 22, wherein if an SNR of a signal received from a BS registered in the IG decreases within a range of a threshold of interference variance, the BS registered in the IG remains in the IG and interference cancellation by the signal received from the BS registered in the IG is maintained.

27. The hard handover apparatus of claim 22, wherein the serving BS is registered in the ICG when the handover is completed.

28. The hard handover apparatus of claim 22, wherein the handover request message includes a difference between an SNR of a interference-canceled signal and an SNR of the interference signal transmitted from each of the BSs.

* * * * *